(12) United States Patent
Iguchi et al.

(10) Patent No.: US 6,473,153 B2
(45) Date of Patent: Oct. 29, 2002

(54) PHOTOGRAPHIC IMAGE PRINT GUIDE AND PRINT PRODUCING METHOD

(75) Inventors: Takeyoshi Iguchi; Moeko Hagiwara, both of Tokyo (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 10/011,627

(22) Filed: Dec. 7, 2001

(65) Prior Publication Data

US 2002/0071682 A1 Jun. 13, 2002

(30) Foreign Application Priority Data

Dec. 8, 2000 (JP) .................................. 2000-373804
Dec. 8, 2000 (JP) .................................. 2000-373805
Mar. 21, 2001 (JP) .................................. 2001-079646

(51) Int. Cl.[7] ............................................. G03B 27/52
(52) U.S. Cl. .............................. 355/40; 355/41; 355/77
(58) Field of Search ............................. 355/38, 40, 41, 355/77; 345/156, 549; 382/162

(56) References Cited

U.S. PATENT DOCUMENTS

| 5,424,754 | A | * | 6/1995 | Bar et al. ..................... 345/549 |
| 5,703,671 | A | | 12/1997 | Narita et al. .................. 355/32 |
| 5,870,175 | A | | 2/1999 | Nakaya ....................... 355/40 |
| RE36,535 | E | * | 1/2000 | Hicks .......................... 355/40 |
| 6,067,075 | A | * | 5/2000 | Pelanek ...................... 345/156 |
| 2001/0053247 | A1 | * | 12/2001 | Sowinski et al. ........... 382/162 |

FOREIGN PATENT DOCUMENTS

GB 2246266 * 1/1992

* cited by examiner

*Primary Examiner*—D. Rutledge
(74) *Attorney, Agent, or Firm*—Squire Sanders & Dempsey L.L.P.

(57) ABSTRACT

A photographic guide print for guiding how to print image data corresponding to a photograhic image; comprises a sheet on which the image data are printed in a form of a standard sample image on a basis of a standard image processing condition; and a remark section provided on the sheet so that information to designate an image processing condition how to retouch the standard sample is written in the remark section in view of the standard sample image.

34 Claims, 21 Drawing Sheets

REQUESTING A PHOTOGRAPHIC PRINT

TRIMMING ORDER

COMPLETE OF TRIMMED PHOTOGRAPHIC PRINT PRODUCTION

FRAME IMAGE DATA

IMAGE DATA EXTRACTED
FROM THE ORIGINAL IMAGE

FRAME IMAGE DATA

IMAGE DATA EXTRACTED
FROM THE ORIGINAL IMAGE

SET DATA FOR SIZE AND LAYOUT
OF THE FACE WITH RESPECT TO
IMAGE FRAME

FRAME IMAGE DATA

SET DATA FOR SIZE AND
LAYOUT OF THE FACE WITH
RESPECT TO IMAGE FRAME

PHOTOGRAPHIC IMAGE PRINT GUIDE AND PRINT PRODUCING METHOD

BACKGROUND OF THE INVENTION

The present invention relates to a photographic image print guide sheet and a photographic print producing method. More specifically, this invention relates to a photographic print producing method which provides the optimum photographic printing for a customer.

A so-called development-print simultaneous process is practiced. According to this process, a silver halide film (negative) is brought into a photofinishing lab after photographing with a silver halide film (negative) camera, and both development and printing can be performed at one time. In the development-print simultaneous process, the silver halide film (negative) is normally developed according to basic conditions without customer's personal preference taken in account. Further, an image made viewable on the silver halide film (negative) is exposed and developed on photographic paper by a printer where basic conditions determined separately according to particular requirements are set.

According to such a development-print simultaneous process, exposure and development are made under the optimum conditions as a whole, and a photograph satisfactory to some extent in lightness and color tone can be obtained. However, when it comes to the quality of the photograph, customer's personal preference is taken into account, so customer's requirements may not be met under the automatically determined conditions. Further, at the time of placing an order, the customer may suggest his or her requirements using a vague expression, for example, "I prefer somewhat light color". However, the exact degree of lightness is determined by the operator operating a printer. This cannot be said to have reflected the customer's requirements completely.

On the other hand, when a customer has been requesting photographic printing for a long period of time at a small photofinishing lab where only one operator is doing the job, the operator of a photofinishing lab is familiarized with the personal preference. In this case, the operator is capable of determining the degree of lightness based on experience. However, such a personal preference differs according to each individual, and cannot be put into words. Since such information cannot be easily conveyed to a third party, it is very difficult to convert it into data and store it in memory, for example, whereby printing is performed in conformity to such data.

The present invention has been made to solve these problems. The first object of the present invention is to provide a photographic print producing method capable of ensuring the optimum image in conformity to customer's personal preference.

Further, the present invention relates to the photographic print producing method capable of providing a photographic print assigned arbitrarily with character information in particular.

A compact camera is generally equipped with a date printing device for exposing date information on a specified position of the image. This date printing device is used to imprint date in the image, whereby the date of taking a picture can be easily recognized at a glance. This will make it easy to arrange photos in order and will provide an excellent commemorative picture of an event.

In the date printing device of a compact camera characterized by direct exposure of the date on the silver halide film (negative), the orange-colored date is printed together with the image. Since it overlaps part of the image, the date is found to obstruct viewing after completion of photographic printing. On the other hand, the date printing device is normally provided with the mode without the date being input. Use of this mode allows the date not to be exposed on the silver halide film (negative). However, this will make it less convenient to organize photographic prints and put them in order, and the date of an event cannot be recognized at a later date.

There is a known art which allows a letter and other information to be imprinted on the photographic print according to the customer's request. However, when a letter and other information are imprinted, customer's order is verbally conveyed to the operator in many cases. After photographic printing has been completed, the letter is found to be located at an inappropriate position, or the color is found to be inadequate. On the other hand, it is theoretically possible for the customer to add or delete a letter by image processing. However, since a special skill is required, not all customers are capable of adequate image processing.

The present invention has been made to solve these problems. The second object of the present invention is to provide a photographic print producing method capable of producing a photographic print containing the character for a date and letter.

Further, the present invention relates to a photographic print producing method capable of easy production of a photographic print trimmed according to the customer's request, a guide print and a trimming region designating tool.

Recently, a development-print simultaneous process which permits both development and printing at one time has come into widespread use in analog (silver halide) photography at a photofinishing lab (print shop). In such printing work, the image on analog photograph is converted into digital form by an image forming apparatus, and a photographic print is produced based on the digital image data. There has been a drastic reduction in costs in the case of printing of the same sized photos alone.

However, looking at the photographic print received, a customer may want to trim only a particular portion in that image to produce a new photographic print. In this case, the customer normally brings a silver halide film (negative) with the image data recorded thereon, and such an image recording medium as a floppy disk. He verbally explains the image to be trimmed and region to be trimmed, and requests the photofinishing lab to perform trimming. In many cases, communication between the customer and photofinishing lab is not sufficient. Further, the operator of the photofinishing lab is required to provide a high level of skill, and this skill including remaking skill accounts for high costs.

Because of this, photographic print trimmed by the photofinishing lab appears different to the customer as compared with what he imagined before. Only in a very rare case, a satisfactory photographic print can be obtained. What is more, a still high cost will be required if the customer requests it to be trimmed by giving more detailed instructions, with the result that he may have to give up the idea of trimming. For this reason, it has not been easy to request a photofinishing lab to trim a photographic print.

On the other hand, in order to protect the reliability of the business and reputation of the organization, the photofinishing lab has to perform trimming job exactly as required by the customer. However, trimming work is done from the memory of what the customer explained orally. When doing the trimming work, the operator is often wondering whether the customer is satisfied with the work or not. Further, there are variations in the trimming skill depending on the operator, and it has been difficult to produce a photographic print trimmed as desired by the customer.

Thus, the third object of the prevent invention is to provide a photographic print producing method which ensures simple and accurate production of a photographic print trimmed as desired by the customer, wherein the image in the mind of a customer is directly reflected in the photographic print.

The present invention further provides a photographic print producing method permitting easy production of a portrait photograph where a human face is trimmed.

The present invention still further provides a trimming region designating tool characterized by simple structure and less cost, wherein any body can easily designate a desired region to be trimmed in the image, and designated information in the region to be trimmed can be provided correctly without fail.

SUMMARY OF THE INVENTION

The first object of the present invention can be achieved by the following first and second photographic print producing methods:

The first photographic print producing method is a method for produce a photographic print based on digital image data characterized by comprising;

(1) a step wherein multiple sample images corresponding to the photographic print with the picture quality changed are formed with respect to the photographic print obtained by treating the aforementioned digital image data under the standard conditions, so that the aforementioned sample images are perused by a customer; and (2) a step wherein the aforementioned standard conditions are corrected, based on the conditions meeting the sample image selected by the customer out of the aforementioned multiple sample images, and the aforementioned digital image data is processed under corrected conditions, whereby a photographic print is produced.

The second photographic print producing method according to the present invention is a method for producing a photographic print by exposing and developing a film image on photographic paper characterized by comprising;

(1) a step wherein multiple sample images corresponding to the photographic print with the picture quality changed are formed with respect to the photographic print obtained when the aforementioned film image is exposed and developed under the standard conditions, so that the aforementioned sample images are perused by a customer; and (2) a step wherein the aforementioned standard conditions are corrected, based on the conditions meeting the sample image selected by the customer out of the aforementioned multiple sample images, and the aforementioned film image is exposed and developed under corrected conditions, whereby a photographic print is produced.

The first photographic print producing method according to the present invention is a method for produce a photographic print based on digital image data characterized by comprising;

(1) a step wherein multiple sample images corresponding to the photographic print with the picture quality changed are formed with respect to the photographic print obtained by treating the aforementioned digital image data under the standard conditions, so that the aforementioned sample images are perused by a customer; and (2) a step wherein the aforementioned standard conditions are corrected, based on the conditions meeting the sample image selected by the customer out of the aforementioned multiple sample images, and the aforementioned digital image data is processed under corrected conditions, whereby a photographic print is produced. Even if the customer is not satisfied with the photographic print gained by processing the digital image data processed under the basic conditions, the image is changed to have the most agreeable lightness and color tone, for example, and is then shown to the customer who will designate the one he prefers. This procedure provides a photographic print satisfactory to the customer. In this case, the picture quality refers to the state of image which can be identified by human eyes. The conditions include the changing of the image processing step, in addition to changing of the exposure time, filtering, etc.

Therefore, the aforementioned picture quality is preferred to be related to at least one of the photographic density, color tone, lightness, unsharpness and edge enhancement of the image. It is more preferred if the sample image with temperature and color tone changed is formed.

Further, quick formation of multiple sample images is enabled if the aforementioned multiple sample images are obtained when the aforementioned digital image data is subjected to image processing which changes the picture quality. This is preferred.

The aforementioned multiple sample images are preferred to be indicated on the display which is available to the customer.

The standard conditions are corrected by click operation of the image appearing on the display, and correction data based on the corrected conditions are stored. The aforementioned digital image data is processed under the corrected conditions by calling out the stored correction data. If this is possible, then a desired image can be easily obtained even if the customer is not familiar with image processing or operation of the printer. Further, the customer feels as if he were operating the printer himself and can get the photographic print to his taste directly and pleasantly without human intervention.

The second photographic print producing method according to the present invention is a method for producing a photographic print by exposing and developing a film image on photographic paper characterized by comprising;

(1) a step wherein multiple sample images corresponding to the photographic print with the picture quality changed are formed with respect to the photographic print obtained when the aforementioned film image is exposed and developed under the standard conditions, so that the aforementioned sample images are perused by a customer; and a step wherein the aforementioned standard conditions are corrected, based on the conditions meeting the sample image selected by the customer out of the aforementioned multiple sample images, and the aforementioned film image is exposed and developed under corrected conditions, whereby a photographic print is produced. Even if the customer is not satisfied with the photographic print gained by exposure and development under the basic conditions, the customer is asked to designate the most agreeable lightness and color tone, and faithful reproduction of the image can be made. This procedure can provide a photographic print satisfactory to the customer. Here the conditions include the changing of the image processing step in the case of image data, in addition to changing of the exposure time, filtering, etc.

Here the aforementioned picture quality is preferred to be related to at least one of the photographic density, color tone, lightness and unsharpness of the image. It is more preferred if the sample image with photographic density and color tone changed is formed.

Moreover, earlier viewing of a sample image is enabled if the aforementioned multiple sample images can be obtained by image processing after the image of the aforementioned film has been converted into the digital image data. This is preferred.

The aforementioned multiple sample images are preferred to be indicated on the display which is available to the customer.

The standard conditions are corrected by click operation of the image appearing on the display, and correction data based on the corrected conditions are stored. The aforementioned film image is exposed and developed under the corrected conditions by calling out the stored correction data. If this is possible, the customer feels as if he were operating the printer himself and can get the photographic print to his taste directly and pleasantly without human intervention.

The aforementioned multiple sample images can be a photographic print obtained by exposure and development of the image of the aforementioned film based on changed conditions.

Further, if there is a step of storing by associating between information on the aforementioned customer and information on the conditions corrected based on the aforementioned sample image selected by the customer, it becomes possible to estimate the customer's personal preference based on stored information when photographic printing is requested subsequently. When producing multiple sample images, for example, it will be possible to meet the customer's preference to a higher degree (to form sample images, for example, based on a little reddish image, not an original image, for the customer fond of reddish image), and to provide high quality services, thereby increasing the number of regular customers. Information on the aforementioned customer is preferred to be stored in the form of barcode.

The aforementioned second object of the present invention can be achieved by the following third to fifth photographic print producing methods:

The third photographic print producing method characterized by comprising;
(1) a step of producing an image medium recording the image based on the image data obtained from the image including at least the date,
(2) a step of automatically reading the information on the aforementioned instructions by setting the medium of the aforementioned image wherein the aforementioned instructions are written, and
(3) a step of producing a photographic print containing the image where the position of the aforementioned date is changed, based on the position where the aforementioned instructions are written, by processing the image data corresponding to the image wherein the aforementioned instructions are written.

The fourth photographic print producing method characterized by comprising;

(1) a step of acquiring the data on date,
(2) a step of producing an image medium recording the image based on the image data obtained from the image without date,
(3) a step of automatically reading the information on the aforementioned instructions by setting the medium of the aforementioned image wherein the aforementioned instructions are written, and
(4) a step of producing a photographic print including the aforementioned date which is formed at a specified position determined according to the position wherein the aforementioned instructions are written, by image processing of the image data corresponding to the image where information on the aforementioned instruction is written and the aforementioned data on date.

The fifth photographic print producing method characterized by comprising;
(1) a step of producing an image medium recording the image based on the image data
(2) a step of automatically reading the information on the position of a character assigned and the contents thereof by setting the medium of the aforementioned image wherein the aforementioned character is written, and
(3) a step of producing a photographic print including the image wherein the aforementioned contents are formed based on the read information on the contents at a specified position determined according to the aforementioned read position of the character assigned.

The third photographic print producing method comprises (1) a step of producing an image medium recording the image based on the image data obtained from the image including at least the date, (2) a step of automatically reading the information on the aforementioned instructions by setting the medium of the aforementioned image wherein the aforementioned instructions are written, and (3) a step of producing a photographic print containing the image where the position of the aforementioned date is changed, based on the position where the aforementioned instructions are written, by processing the image data corresponding to the image wherein the aforementioned instructions are written. When a customer want to change the position of date on the specific image in the silver halide film (negative) where the date is exposed, using the date printing device of a silver halide film (negative) camera (except for so-called APS camera), for example, the customer writes the information on specified instruction in the medium of the aforementioned image where such an image is formed, and hands it over to the operator of a photofinishing lab. Then the operator or device of the photofinishing lab recognizes that the customer desires to change the position of date in the image. At the same time, a new position for date can be identified automatically. In this way, it is possible to get a photographic print in conformity to the customer requirements. The "image data" includes the image data obtained by direct photoelectric conversion of the subject image using a digital still camera or the like, in addition to the image data obtained by reading the image exposed on the silver halide film (negative) using a scanner. The "instruction information" includes such as triangles and circles, and a barcode or the like can also be used. The "image medium" can contain the data recording medium such as FD and CD, in addition to photographic print.

The fourth photographic print producing method comprises (1) a step of acquiring the data on date, (2) a step of producing an image medium recording the image based on the image data obtained from the image without date, (3) a step of automatically reading the information on the aforementioned instructions by setting the medium of the aforementioned image wherein the aforementioned instructions are written, and (4) a step of producing a photographic print including the aforementioned date which is formed at a specified position determined according to the position wherein the aforementioned instructions are written, by image processing of the image data corresponding to the image where information on the aforementioned instruction is written and the aforementioned data on date. So when a customer wants to insert the date at a specified position regarding a specific image exposed on the so-called APS film capable of storing the date as magnetic information, the customer writes the information on specified instruction in the medium of the aforementioned image where such an image is formed, and hands it over to the operator of a photofinishing lab. Then the operator or device of the photofinishing lab automatically recognizes the position for insertion desired by the customer. In this way, it is possible to get a photographic print easily in conformity to the customer requirements.

Further, if the aforementioned method contains a step of setting a color of the aforementioned date based on the aforementioned information on specified instruction, the date can be formed in the color desired by a customer.

The fifth photographic print producing method comprises (1) a step of producing an image medium recording the image based on the image data, (2) a step of automatically reading the information on the position of a character assigned and the contents thereof by setting the medium of the aforementioned image wherein the aforementioned instructions are written, and (3) a step of producing a photographic print including the image wherein the aforementioned contents are formed based on the read information on the contents at a specified position determined according to the aforementioned read position of the character assigned. If a customer wants to have a photographic print where such letters as "Merry X'mas" are added to the image as the content of the character, the customer writes letters directly in the medium of the image where the original image without containing the letters is formed, and hands it over the operator of the photofinishing lab. Then the operator or device of the photofinishing lab automatically recognizes the position assigned for insertion and contents of the letters. In this way, it is possible to get a photographic print meeting the customer requirements. The "character" under hereunder is defined as information of all types such as a letter, numeral, code, symbol and others which can be electronically coded.

Further, it is preferred that the customer can directly write the aforementioned character in the medium produced where the aforementioned image is formed, for example.

It is possible to obtain a photographic print with a character arranged at the position desired by the customer if the aforementioned character is formed on the aforementioned photographic print corresponding to the position where the aforementioned character is written in the medium of the aforementioned image, or in the vicinity thereof.

Still further, if there is a step of reading the aforementioned character using a character recognition function or the like, and electronically coding the reading, then the details of the character can be formed easily based on the coded data.

When the aforementioned character written in the aforementioned image medium contains information on the specified instruction, the customer need not place an order for the color and direction orally or in writing if at least one of color and direction of the character is determined according to this information on the specified instruction.

Still further, if the aforementioned image medium comprises a print portion where the image is printed and a transparent material positioned with respect to the aforementioned image on the print portion, and the aforementioned character is directly written in the aforementioned transparent material, then the character written on the aforementioned transparent material can be easily read by separation between the aforementioned print portion and aforementioned transparent material even if a character is written immediately above the image with black pen.

The third object of the prevent invention can be achieved by the following sixth to eighth photographic print producing methods, ninth guide print and tenth trimming region designating tool:

The sixth photographic print producing method according to the present invention provides a photographic print producing method for producing a trimmed photographic print by an image forming apparatus using a print with positive image formed thereon, and comprises;

(1) a step of reading the region designation information when the aforementioned print where the region designation information for the customer to designate a desired region to be produced as a photographic print is formed on the image is set on the image on the reading means of the image forming apparatus, (2) a step of selecting and reading image information corresponding to the designated print image from the image recording medium, (3) a step of determining the region to be formed as a photographic print, based on the region designation information in the aforementioned print in the aforementioned selected image information, and (4) a step of producing the photographic prints in the number of sheets and size desired by the customer in conformity to the region determined above.

The aforementioned region designation information denotes the line or symbol for specifying a trimming range.

The seventh photographic print producing method according to the present invention provides a method of producing a trimmed photographic print by means of an image forming apparatus using a print with positive image of a person formed thereon.

This method comprises;

(1) a step of reading the region designation information when the aforementioned print where a face designation information for a customer to designate the face of a person that the customer desires to be produced as a photographic print is formed on the image is set on the image on the reading means of the image forming apparatus, (2) a step of selecting and reading image information corresponding to the designated print image from the image recording medium, (3) a step of determining the region where the face of a person specified based on the face designation information in the aforementioned print is included within the predetermined size and layout, in the aforementioned selected image information, and (4) a step of producing the photographic prints in the number of sheets and size desired by the customer in conformity to the region determined above.

The aforementioned face designation information is formed by tracing the profile of the face of the person.

The aforementioned face designation information is formed by lines denoting the length or width of the face of the person.

The aforementioned image recording medium is made of at least one of a film and print paper recording image information and the floppy disk, CD, MO and memory chip storing the image information as digital data.

The aforementioned print is a guide print for providing a guide display in the form of a list for a glance showing the data recorded on the image recording medium, by recording as frame image the multiple images recorded on the image recording medium produced according to multiple image data obtained from the image containing the subject.

The aforementioned guide print records the medium specific information for specifying the aforementioned image recording the medium having the same image as the frame image. Identity with the image recording medium recording the image information is automatically confirmed by reading the guide print.

The aforementioned guide print has instruction information the writer corresponding to each frame image, and the customer-desired quantity and/or size instruction information is formed in the instruction information writer.

The aforementioned guide print has the surface where each frame image is indicated, and this surface consists of a material which allows rewriting with a writing tool.

A transparent material which is positioned with respect to the image and consists of the material permitting writing by a writing tool is stacked on the back of the aforementioned guide print, and various types of information can be directly written on the aforementioned transparent material.

The eighth photographic print producing method provides a method of producing a photographic print trimmed with the print with positive image formed thereon using an image forming apparatus. This method comprises;

(1) a step of reading the image per se recorded on the print and the information formed on the print by setting to the reading means of the image forming apparatus the aforementioned print where region designation information for the customer to designate the region that the customer desires to be produced as a photographic print is formed on the image, (2) a step of image-processing and extracting the region designated according to the aforementioned region designation information in the aforementioned read image, and (3) a step of producing the photographic prints in the number of sheets and size desired by the customer in conformity to the region extracted above.

The aforementioned print is a guide print for providing a guide display in the form of a list for a glance showing the data recorded in the image recording medium by recording as a frame image the multiple images recorded in the image recording medium produced based on the multiple image data obtained from the image containing a subject.

The aforementioned guide print has an instruction information writer for each frame image, and instruction information on the number of sheets and size desired by the customer is formed in the instruction information writer.

The aforementioned guide print has the surface where each frame image is indicated, and this surface consists of a material which allows rewriting with a writing tool.

A transparent material which is positioned with respect to the image and consist of the material permitting writing by a writing tool is stacked on the back of the aforementioned guide print, and various types of information can be directly written on the aforementioned transparent material.

The ninth photographic print producing method is a guide print for providing a guide display in the form of a list for a glance showing the data recorded in the image recording medium by recording as a frame image the multiple images recorded in the image recording medium produced according to the multiple image data obtained from the image containing a subject. It is characterized in that an instruction information writer for writing the instruction information on the number of sheets and size corresponding to each frame image is provided on the same surface as the aforementioned frame image.

The surface with a frame image displayed thereon consists of the material permitting rewriting with a writing tool.

A transparent material which is positioned with respect to the frame image and consists of the material permitting writing by a writing tool is stacked on the surface where the aforementioned frame image is displayed, and various types of information can be directly written on the aforementioned transparent material.

The tenth photographic print producing method provides a trimming region designating tool used to record on the aforementioned image a rectangular frame line for specifying the a trimming region for trimming the specific site of the image in the medium where image is recorded. This trimming region designating tool consists of two mutually slidably plates, and each plate has a notch of approximately the same configuration as that of the image frame recorded in the aforementioned medium, and the size of the opening formed by overlapping of the notches of the plates with each other can be changed in similar figures by mutual sliding of plates.

DETAILED DESCRIPTION OF THE PREFERRED EMBODIMENT

Figure 1:
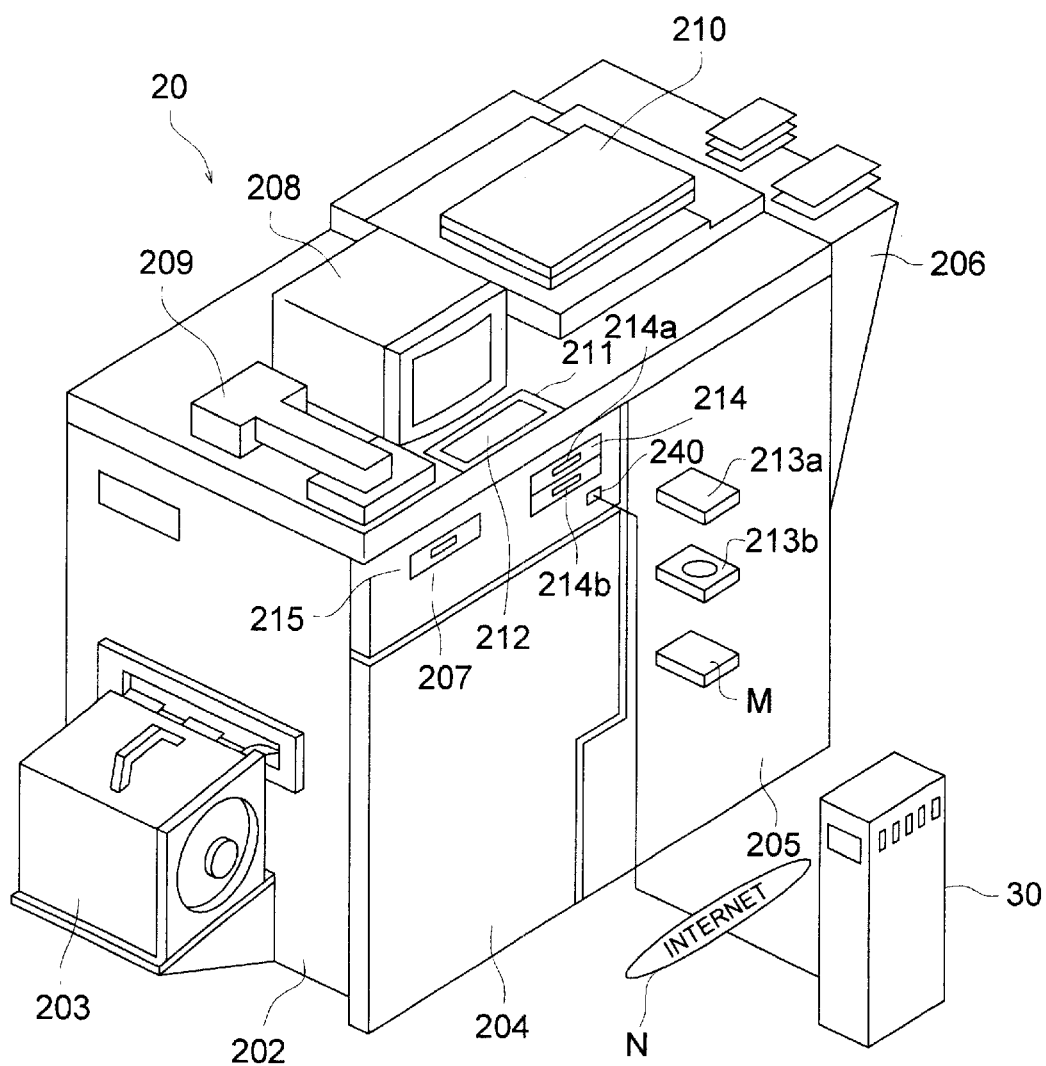
FIG. 1 is an oblique view representing a printer used in the embodiment according to the present invention.

The following describes the photographic print producing-method according to the embodiment of the present invention with reference to drawings:

FIG. 1 is an oblique view representing a printer used in the embodiment according to the present invention. In FIG. 1, a printer 20 is installed in a photofinishing lab. Development is carried out by exposure on the photographic paper, thereby to producing a print. This type is often exemplified. However, the printer is not restricted to this type. Any printer capable of producing a print according to image information will serve the purpose. For example, a jet ink printer may be an electrophotographic printer. Use of a roll-shaped image former is particularly preferred. The printer 20 may be connected to the server via the Internet.

The printer 20 used in the present has a magazine storage 203 provided on the left of the main body 202. The inside of the main body 202 is equipped with an exposure processor 204 for exposure on the roll-shaped photosensitive material (photographic paper) as an image former, and a print producing unit 205 for developing and drying the exposed photosensitive material to produce a print and to cut it to a specified length. The produced print is ejected to the tray 206 located on the right of the main body 206. Further, inside the main body 202, a controller 207 is provided above the exposure processor 204. The magazine storage 203 capable of storing multiple photosensitive materials having different widths is designed to allow a corresponding signal to be sent to a controller 207 according to the type (size, etc.) of the roll-shaped photosensitive material to be stored.

Further, a CRT 208 is installed on the top of the main body 202. This CRT208 serves as a display for indicating the sample image of the color tone guide to be described later on the screen as required. A film scanning unit 209 as an image reader for reading a transparent original is installed on the left of the figure of the CRT208, and a reflective original input apparatus 210 is arranged on the right.

An original read from a film scanning unit 209 or reflective original input apparatus 210 includes a photosensitive material. A color silver halide film (negative) and color reversal film are preferred as this photosensitive material. A black/white silver halide film (negative) or black/white reversal film may also be used. The image photographed by the silver halide film (negative) camera can be converted into digital information by the film scanner on the film scanning unit 209 and can be made into image data. Further, the photosensitive material is color paper, it can be formed into image data by the flat head scanner of the reflective original input apparatus 210.

Further, an image transfer unit 214 is provided on the controller 207 of the main body 202. In addition to the aforementioned removable media M (PC card), an IC card 213a storing the image data and a floppy disk 213b can be inserted in the image transfer unit 214. The image data or the like of the inserted storage media is inserted. The image data of the inserted medium is read out.

An operation unit 211 is arranged on the front of the CTR208. This operation unit 211 is provided with an information input means 212. The information input means 212 is composed of a touch panel, for example. Conditions on exposure and development can be input from this position.

Further, a storage media writer 215 is provided on the main body 202. It is also provided with a write means K (FIG. 2) for writing the image data of the magnetic storage media 216 (FIG. 2) to the optical storage media 217 (FIG. 2) or the like when image data is out from the removable media M containing with image data or the like, and a print is produced.

To put it more specifically, multi-media card, a removable media such as memory stick, MD, CD-ROM or the like can be mentioned for storing image data as a storage medium for storing image data, without being restricted thereto.

The operation unit 211, CTR208, film scanning unit 209, reflective original input apparatus 210, image transfer unit 214 and storage media writer 215 are installed on the main body 202 as one integral structure, but any one or more of them can be installed independently of the rest.

Figure 2:
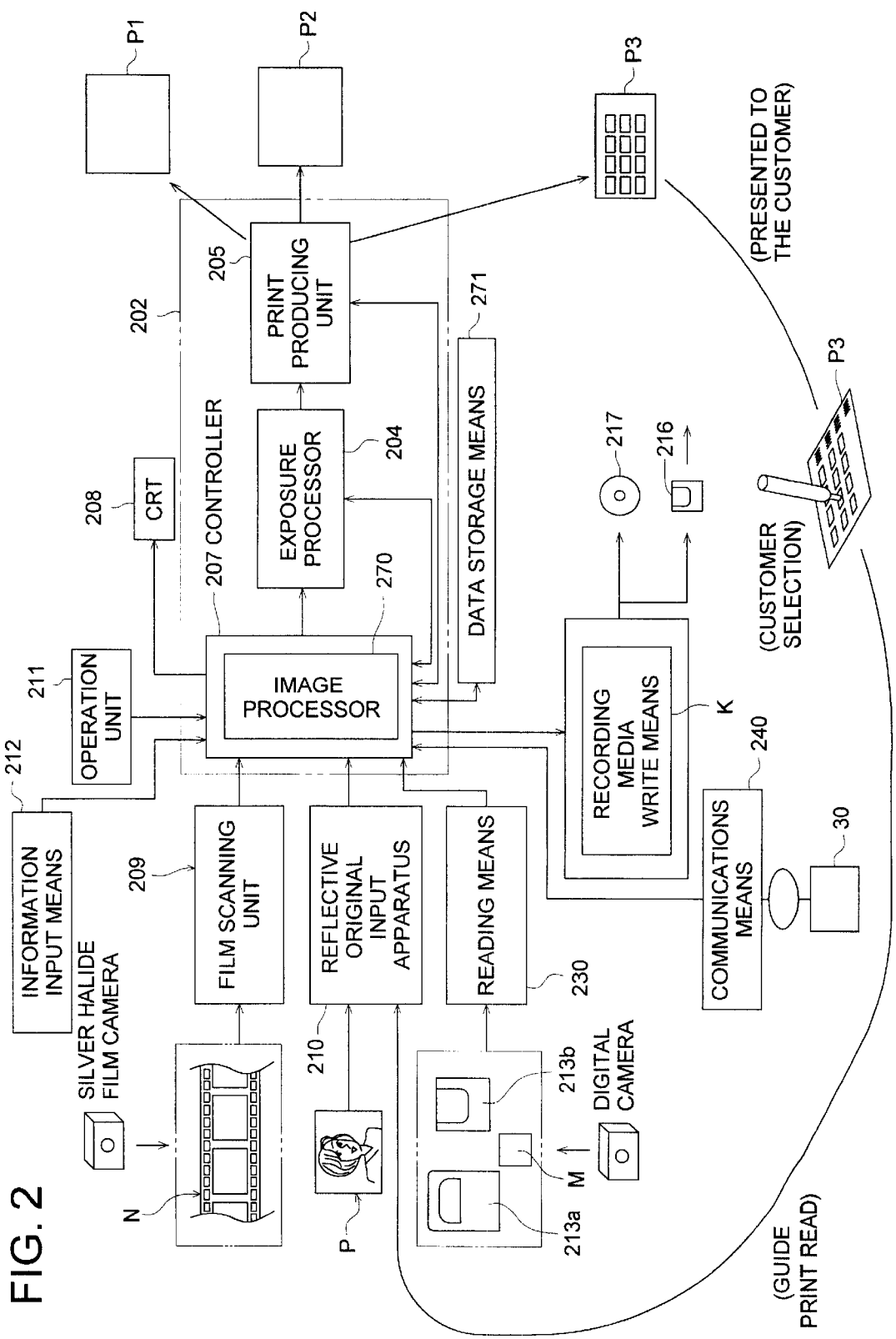
FIG. 2 is a block diagram representing a configuration of a printer 20.

FIG. 2 is a block diagram representing a configuration of a printer 20.

According to the command information from the information input means 212, the controller 207 of the printer 20 reads original information from a film scanning unit 209 and the reflective original input apparatus 210, gets image information, and displays it on the CTR208.

The printer 20 has a data storage means 271. The image data read from a removable media M and the corresponding print order information (information on how many prints should be produced from the image of the frame and what is the frame, and information on print size, etc.) can be stored sequentially into the data storage means 271. Frame image from the developed silver halide film (negative) N obtained by developing the silver halide film (negative) photographed by the silver halide film (negative) camera is input from the film scanning unit 209. The frame image from the print P obtained by imprinting and developing the frame image onto photographic paper is input from the reflective original input apparatus 210.

The controller 207 has an image processor 270. Image information is processed by this image processor 270, and image information for exposure is formed and sent to the exposure processor 204. In the exposure processor 204, image is exposed onto the photosensitive material, and this photosensitive material is sent to the print producing unit 205. The photosensitive material exposed by the print producing unit 205 is developed and dried to produce a photographic print P1 (development-print simultaneous process), photographic print P2 (enlarged print) and photographic print P3 (guide print).

The image transfer unit 214 of this printer 20 has a reading means 230 for reading and transferring such image data as removable media M and a communications means 240 capable of communication with the server 30. The reading means 230 can read stored image data from the removable media M inserted into the image transfer unit 214, and can transfer it to a controller 207 composed of a microcomputer. On the other hand, communications means 240 communicates with the server 30 via the network N, and image data or the like can be input into it.

First Embodiment

Figure 3:
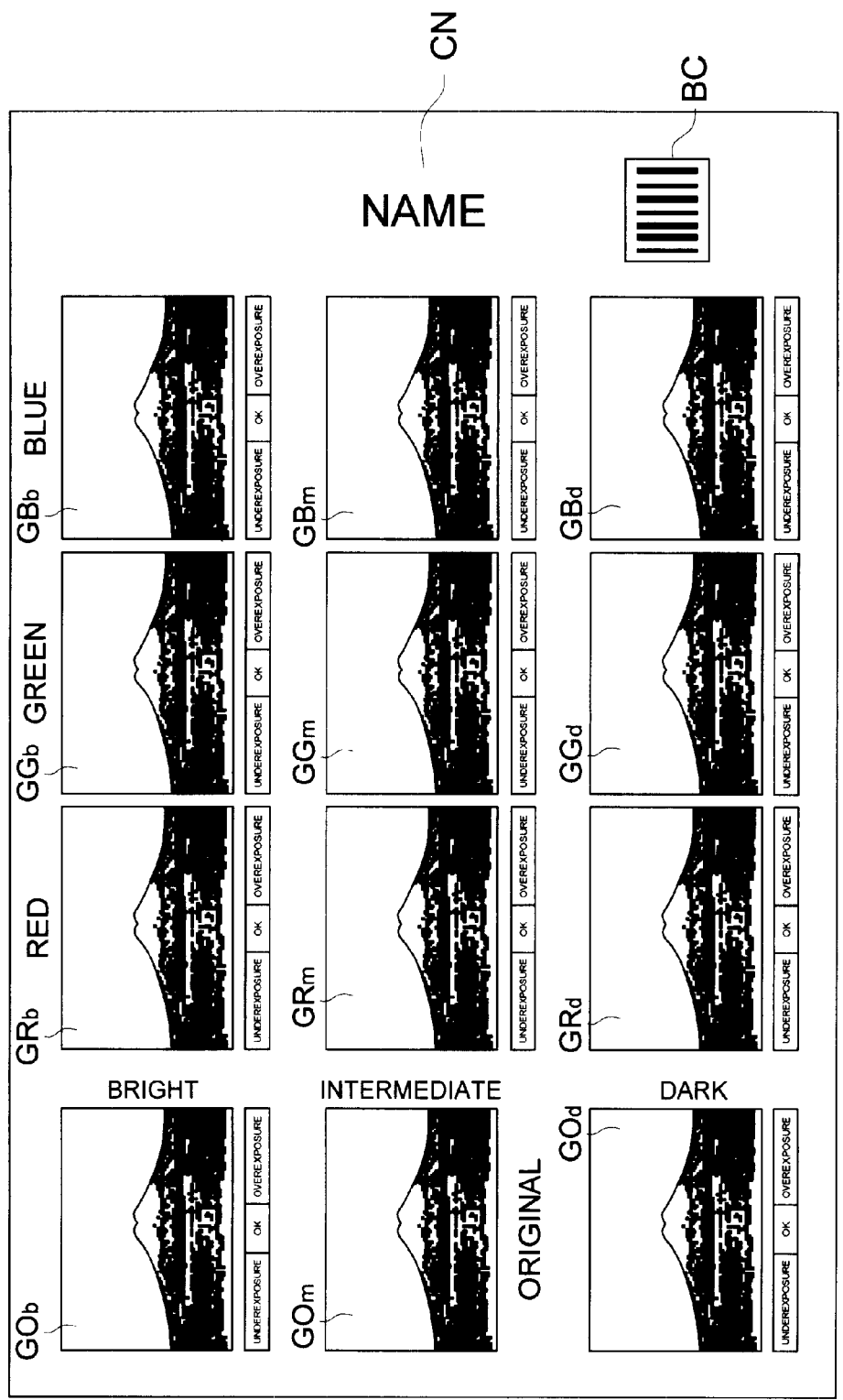
FIG. 3 is a drawing representing an example of a guide print in the first embodiment.

The following describes the photographic print producing method according to the first embodiment to achieve the first object using the printer 20 of the present embodiment: Assume that a customer carries a developed silver halide film (negative) (may not be developed) to the photofinishing lab to have a specific image enlarged. When the film is not yet developed, the silver halide film (negative) is developed by the operator of the photofinishing lab with a development device (not illustrated). After that, the specific image is read by the film scanning unit 209 of the printer 20 and is converted into image data. Further, based on the read image data, the operator of the photofinishing lab uses the printer 20 to produce a guide print displaying sample images with different degrees of lightness and color tone using the sample image. FIG. 3 shows an example of the guide print.

In FIG. 3, an original image GOm is printed in the middle of the left end. This original image GOm has approximately the same lightness and color tone as those when the image of silver halide film (negative) is exposed and developed under the conditions (initial set value) basic to photographic paper. Above the original image GOm, a sample image Gob one step brighter than the GOm is printed. Below the original image GOm, a sample image GOd one step darker is printed.

Further, a red-based sample image GRm of enhanced red compared to the original image GOm is printed on the right side of the original image GOm. A sample image GRb a step brighter than red-based sample image GRm is printed above it. A sample image GRd one step darker than red-based sample image GRm is printed below the GRm.

Further, a green-based sample image GGm of enhanced green compared to the original image GOm is printed on the right of the red-based sample image GRm. A sample image GGb one step brighter than green-based sample image GGm is printed above it. A sample image GGd one step darker than green-based sample image GGm is printed below the GGm.

A blue-based sample image GBm of enhanced blue compared to the original image GOm is printed on the right of the green-based sample image GGm, namely, in the vicinity of the right end of the guide print. A sample image G3b one step brighter than the blue-based sample image GBm is printed above it. Below the blue-based sample image GBm, a sample image GBd one step darker than blue-based sample image GBm is printed.

A barcodes BC is formed on the right end of the guide print. This barcode contains customer name CN and customer information (address, name, telephone number, E-mail address, etc.).

After having been produced, such a guide print is submitted to the customer. The customer peruses this guide print, and designates a sample image (or original image) best suited to his preference. To give this designation, the customer has only to encircle "OK" below the sample image, for example, as shown in FIG. 2. The aforementioned marked print (P3 in FIG. 2) is read by the reflective original input apparatus 210, and the customer requirements are automatically identified. Based on this information, the basic conditions exposure and development are corrected, and a photographic print most suited to the customer's preference can be produced under the corrected conditions. The sample image is simple and should be submitted in the form of a photographic print, as described above. It may also be displayed on the CRT.

The guide print returned from the customer contains correction conditions required by the customer and customer information, and is kept in storage as it is or in the form of digital data (database). Thus, when there is any order for production of a photographic print from the same customer in future, the photofinishing lab can estimate the customer preference based on the stored guide print. To put it more specifically, if the customer is considered to be fond of brighter image, a one step brighter image is placed on the original image, and a guide print is created around it. This can be shown to the customer. This allows a photofinishing lab to select an image more suitable to the preference of a specific customer. Such a high-quality service can be provided. If such services are provided on a continuous basis, a greater number of regular customers can be obtained.

In the aforementioned embodiment, a photographic print is obtained from the image exposed on silver halide film (negative). A photographic print can be obtained using a printer in the same manner, based on the digital image data obtained from a digital still camera or the like. In this case, the sample image with the same picture quality as FIG. 3 changed separately can be easily produced by image processing of original digital image data. A photographic print meeting the customer preference can also be easily produced by image processing under connected conditions according to the original image data.

Figure 4:
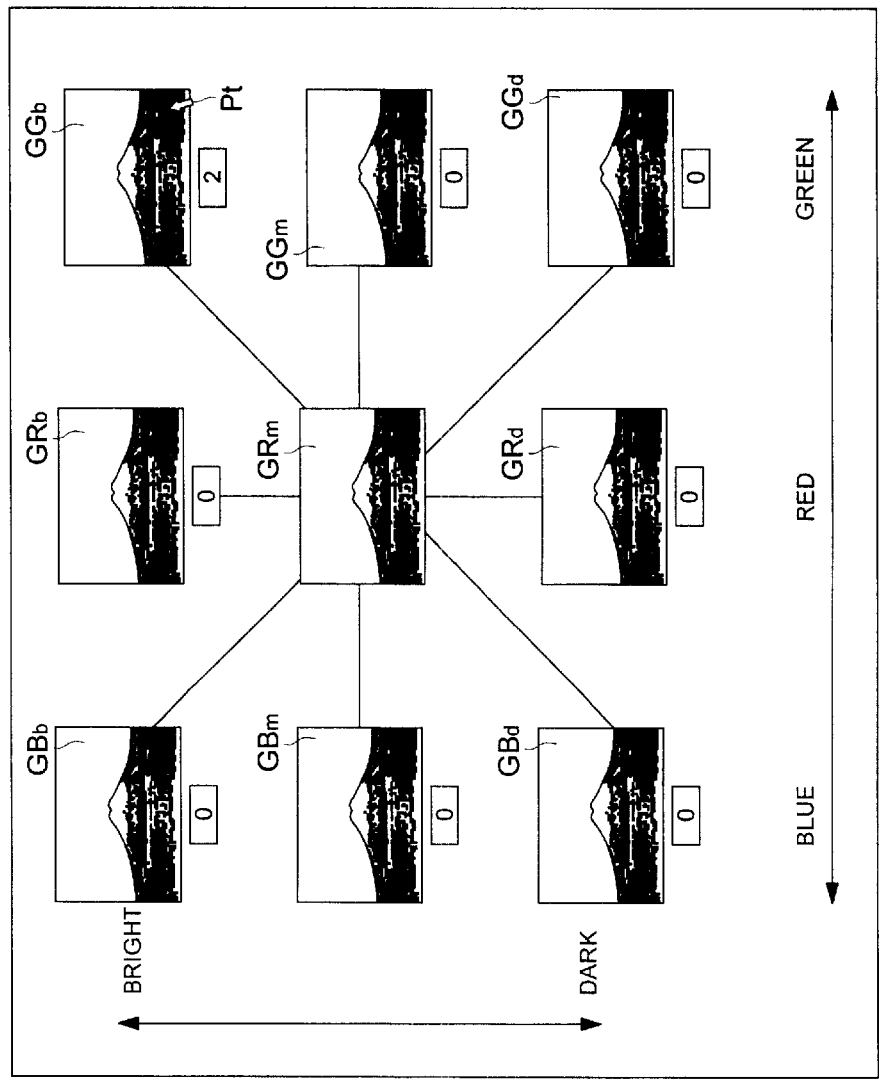
FIG. 4 is a drawing showing an example of a guide displayed on the screen of the CRT208.

The following describes an example of the variation of the present embodiment. The operator of a photofinishing lab displays the guide showing sample images obtained by different processing of the same image according to the image data read into the CTR208 of the printer 20. FIG. 4 is a drawing showing an example of a guide displayed on the screen of the CTR208.

In FIG. 4, a red-based sample image GRm of enhanced red compared to the red-based color is displayed in the middle of the screen. This GRm has approximately the same lightness as that of the image of the silver halide film (negative) exposed and developed on photographic paper under the basic conditions. A sample image GRb one step brighter than the red-based sample image GRm is displayed above it. Below it, a sample image GRd one step darker than red-based sample image GRm is displayed.

On the right end of the screen, a green-based sample image GGm of enhanced green compared to the green-based color is displayed. This GGm has approximately the same lightness as that of the image of the silver halide film (negative) exposed and developed on photographic paper under the basic conditions. A sample image GGb one step brighter than the green-based sample image GGm is displayed above it. Below it, a sample image GGd one step darker than green-based sample image GGm is displayed.

On the left end of the screen, a blue-based sample image GBm of enhanced blue compared to the blue-based color is displayed. This GBm has approximately the same lightness as that of the image of the silver halide film (negative) exposed and developed on photographic paper under the basic conditions. A sample image GBb one step brighter than the blue-based sample image GBm is displayed above it. Below it, a sample image GBd one step darker than blue-based sample image GBm is displayed.

Using a mouse (not illustrated), the customer having perused the screen display moves the pointer Pt onto the sample image (e.g. sample image GGb) best suited to his preference and left-click the mouse. The sample image is selected. The printer 20 corrects the basic conditions for exposure and development based on the corresponding image data, and the photographic print having approximately the same lightness and color tone as those of the selected sample image can be produced automatically under the corrected conditions.

When the displayed sample images do not contain a color meeting the customer requirements, place the pointer Pt on the sample image GGb for example, and right-click the mouse twice. Then another step brighter sample image is displayed. Alternatively, "2" is displayed in the frame below the sample image to indicate the number of clicks. Then the printer 20 recognizes that a still brighter image meets the customer preference. At the same time, the customer himself can make sure that his operation is correct. In this case, the printer 20 may perform image processing and display a little brighter sample image GGb according to the customer instruction.

Another example of the variation of the present embodiment is that image data required for display as shown in FIG. 4 is stored in the CD which is handed over to the customer. If the customer selects a screen at the photofinishing lab he may make a wrong selection due to limit time or the operator of the printer 20 may be disturbed in his work. To solve this problem, image data required for display as shown in FIG. 4 is stored in the CD and is handed over to the customer. Then the customer performs the aforementioned operation on his own personal computer. He can spend as much time as possible to adjust the photographic print. Then the customer selection is reported to the photofinishing lab in the form of a CD or memorandum. According to this instruction, the printer 20 corrects the basic conditions for exposure and development. Then the photographic print having approximately the same lightness and color tone as those of the selected sample image can be produced automatically under the corrected conditions.

According to such a variation, there is almost no room for invention of an operator between the customer and printer 20. The customer feels as if he were operating the printer 20 directly. Namely, while enjoying the image photographed by himself, the customer can produce a photographic print having the lightness and color tone to his taste. Further, the photofinishing lab can avoid the trouble of producing a photographic print which fails to reflect the customer's preference. This will cut down the time and cost required for remaking, and will contribute to winning the customers feeling an attachment to photographic printing.

This invention has been explained with reference to embodiments. It should not be understood that the present invention is limited only to the above embodiments. It goes without saying that the invention can be modified and improved as appropriate whenever required.

The following provides a photographic print producing method capable of getting the optimum image in conformity to customer preference.

Second Embodiment

The following describes the photographic print producing method according to the second embodiment to achieve the second object using the printer 20 of the present embodiment: Assume that a customer carries a developed silver halide film (negative) (may not be developed) to the photofinishing lab to have it subjected to a development-print simultaneous process. When the film is not yet developed, the silver halide film (negative) is developed by the operator of the photofinishing lab with a development device (not illustrated). After that, the entire image is read by the film scanning unit 209 of the printer 20 and is converted into image data. Further, based on the read image data, the operator of the photofinishing lab uses the printer 20 to produce a guide which is a so-called guide print (image medium). FIG. 3 shows an example of the guide print P3.

Here assume that the date is exposed in the silver halide film (negative) photographed by the customer using the date printing device of the silver halide film (negative) camera. Therefore, the date is also exposed in each image in the guide print P3 shown in FIG. 3. Information II associating between color and number is formed on the right end of the guide print P3 shown in FIG. 3. When the customer information is already known, the customer name CN may be given on the right end of the guide print P3 and a barcodes 3C may be formed to contain customer information (address, name, telephone number and E-mail address).

The customer having received such a guide print P3 from the photofinishing lab is entitled to request correction of an inadequate image where, for example, the date overlaps the subject partly. The following describes how to place an order for this correction: The customer enters a triangular mark (instruction information) with numeral 6 inserted therein at the desired position of date (on the right bottom of the image in this case) in the image G1 where date correction is desired on the guide print P3. Further, the customer enters a triangular mark with numeral 1 inserted therein at the desired position of date (on the left top of the image in this case) in the image G2 where date correction is desired on the guide print P3. Here the triangular mark is defined as deleting the date from the image and forming a date at a new position. Further, the numeral denotes the color of the date (1: white, 2:black, 3: red, 4: blue, 5:green and 6:yellow).

When the guide print P3 marked by the customer is handed over to the operator of the photofinishing lab as shown in FIG. 2, the operator sets this guide print P3 to the reflective original input apparatus 210 of the printer 20, and the image is automatically read. (In this case, barcode BC may be read together). The image marked with a triangle, the marked position (e.g. vertex of the triangular) and numeral therein can be identified by processing of the image data output from the reflective original input apparatus 210. In this case, the above information may be obtained by the operator of the photofinishing lab.

Based on the aforementioned information, the printer 20 processes the image G1. It reads the original date and deletes after having converted into an electronically code. Then a new date D1 is formed in conformity to the electronic code in yellow color on the right bottom of the image (see FIG. 4). On the other hand, the image G2 is subjected to image processing in the same way. The printer reads the original date and converts it into an electronically code. Then a new date D2 is formed in conformity to the electronic code in black on the left bottom of the image (see FIG. 5). This art is well known, so detailed description will be omitted.

The following describes the second embodiment: When a so-called APS film is used for photographing, the date is contained in the silver halide film (negative) as magnetic information, and date is not exposed in the image. In this case, the customer wishes to insert the date at a desired position in a desired color. Then the customer can place an order for insertion using the guide print P3 (FIG. 3) as an image medium provided by the photofinishing lab.

Such a mode of ordering is the same as that mentioned in the aforementioned embodiment. The customer enters a triangular mark with numeral 6 inserted therein at the desired position of date (on the right bottom of the image in this case) in the image G1 where date correction is desired on the guide print P3. Further, the customer enters a triangular mark with numeral 1 inserted therein at the desired position of date (on the left top of the image in this case) in the image G2 where date correction is desired on the guide print P3. This guide print is handed over to the operator of the photofinishing lab in the same way as above, the printer 20 identifies the image marked with a triangle, the marked position (e.g. vertex of the triangular) and numeral therein.

Figure 5:
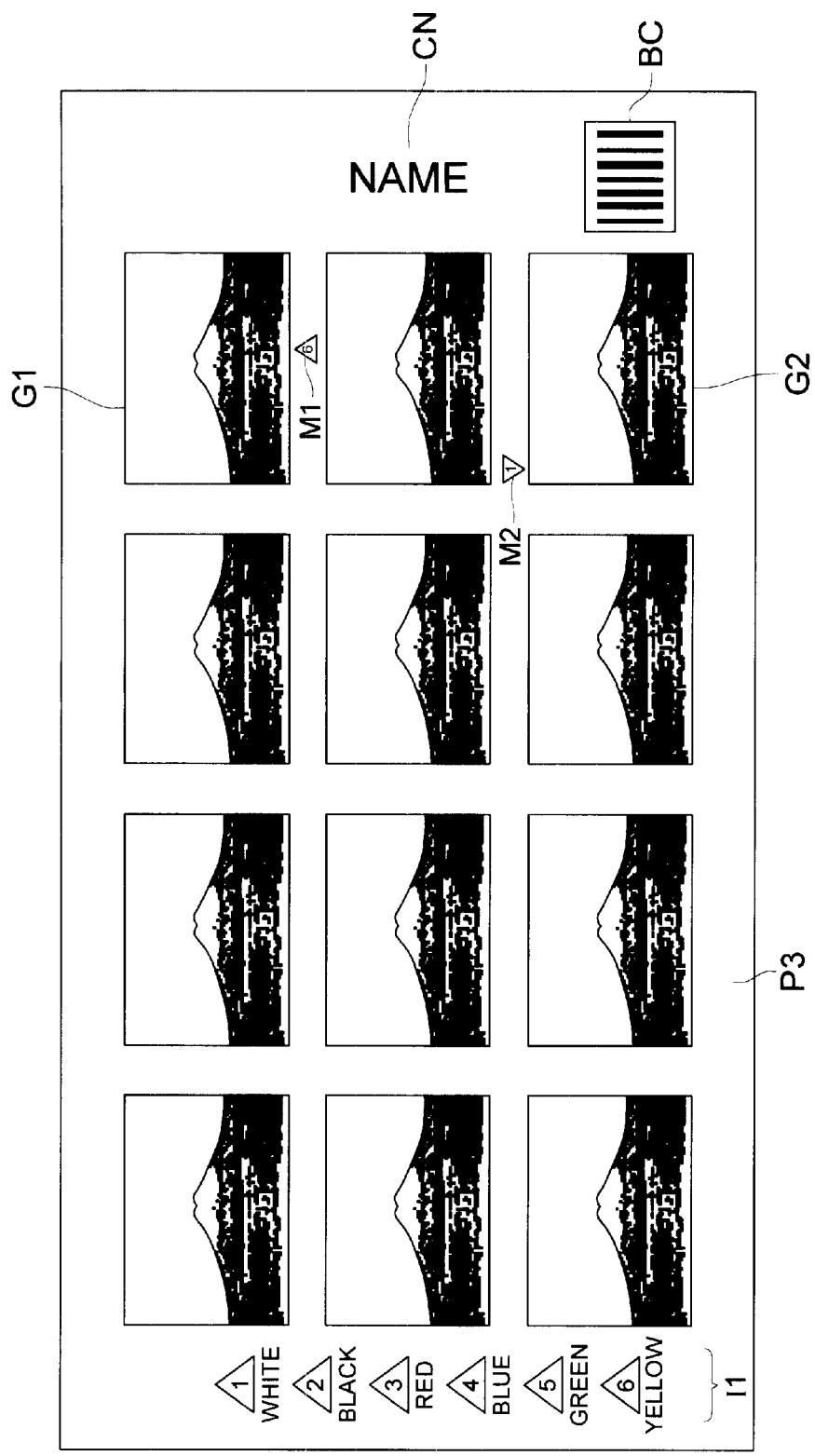
FIG. 5 is a drawing showing an example of a guide print as a second embodiment.

Based on the aforementioned information, the printer 20 processes the image G1, and additionally forms by synthesizing, in yellow color on the right bottom of the image, the date D1 based on the date obtained in advance by the APS silver halide film (negative) (FIG. 4). On the other hand, the image G2 is subjected to image processing in the same way, and additionally forms by synthesizing, in black color on the left bottom of the image, the date D2 based on the date obtained in advance by the APS silver halide film (negative) (FIG. 5), whereby the photographic print can be produced (FIG. 5).

The following describes the third embodiment: A customer may wish that a photographic print containing letters for caption or the like were formed on a specific image. The normal silver halide film (negative) camera, however, is not configured to allow a character including a desired letter to be exposed on the image. A photographic print with a desired character inserted in an image can be provided according to this embodiment.

Similarly to the aforementioned embodiment, a customer carries a developed silver halide film (negative) (may not be developed) to the photofinishing lab to have it subjected to a development-print simultaneous process. When the film is not yet developed, the silver halide film (negative) is developed by the operator of the photofinishing lab with a development device (not illustrated). After that, the entire image is read by the film scanning unit 209 of the printer 20 and is converted into image data. Further, based on the read image data, the operator of the photofinishing lab uses the printer 20 to produce a guide print P3 (image medium).

Figure 6:
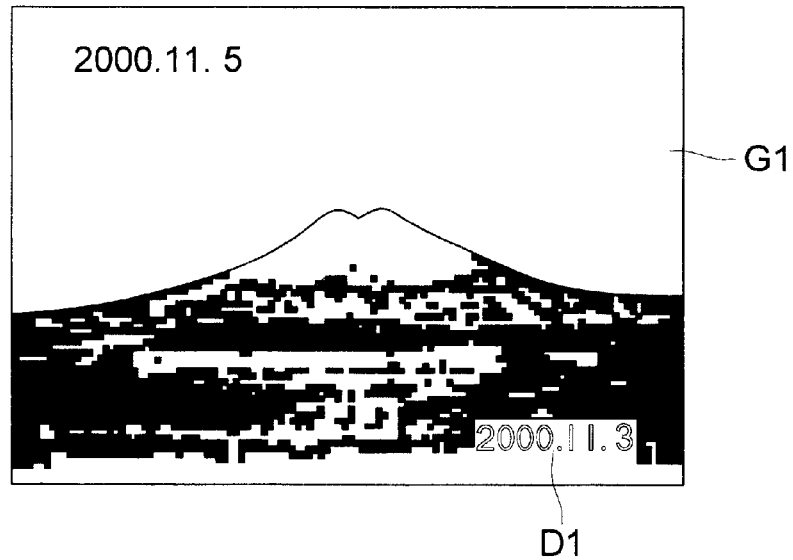
FIG. 6 is a drawing showing an example of a photographic print.

FIG. 6 shows an example of guide print P3. Information I2 associating between color and number is formed on the left end of the guide print P3 shown in FIG. 6.

The customer having received such a guide print P3 from the photofinishing lab is entitled to request insertion of a character into a desired image. The following describes how to place an order for this insertion: The customer enters at the desired position a circle mark M3 with numeral 1 inserted therein and a letter of Mt. FUJI desired to be inserted.

Here the circle mark (instruction information) is defined as additionally synthesizing on the image the ensuing letter C1 desired to be inserted (Mt. FUJI in this case). Further, the numeral denotes the color of the character (1: white, 2:black, 3: red, 4: blue, 5:green and 6:yellow). In this embodiment, a character is composed of a circle mark M3 and a letter C1 desired to be inserted. The character corresponds to the letter C1 desired to be inserted, Mt. FUJI in this case. It is not restricted to an alphabet; it may be a kanji (Chinese character), katakana (Japanese phonetic alphabet), hiragana (cursive kana character), numeral, symbol or code.

When a guide print P3 containing the entries of a circle mark M3 and a letter C1 desired to be inserted has been handed over to the operator of the photofinishing lab by the customer, the operator sets this guide print P3 to the reflective original input apparatus 210 of the printer 20, and the image is automatically read. The image containing the circle mark M3, the position of the ensuing letter desired to be inserted C1, details of the character (Mt. FUJI in this case) and numeral in the circle mark M3 can be identified by processing of the image data output from the reflective original input apparatus 210. In this case, the above information may be obtained by the operator of the photofinishing lab.

Based on the aforementioned information, the printer 20 processes the image G3, and produces a photographic print with the letter of Mt. FUJI formed in white at the position desired by the customer (right top in this case).

The circle mark M3 is part of the character. This means that it is not included in the contents of the character. It need not be written at the top of the character. It may be written at the last position of the character or at an intermediate position. Further, when an arrow mark (instruction information) M4 instead of a circle mark is used, for example, as shown in the image G4 of FIG. 6, it is possible to produce a photographic print where arrangement and direction of its ensuing letters agree with those of the arrow.

Figure 7:
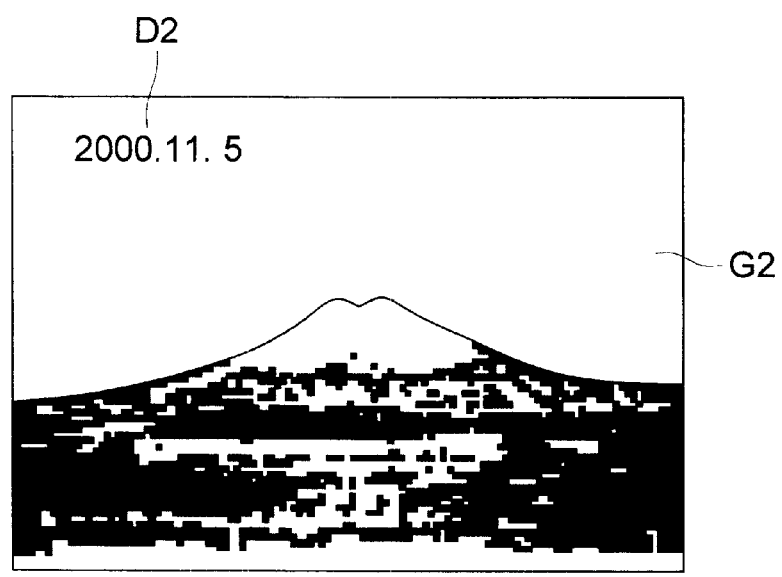
FIG. 7 is a drawing showing an example of a photographic print.
Figure 8:
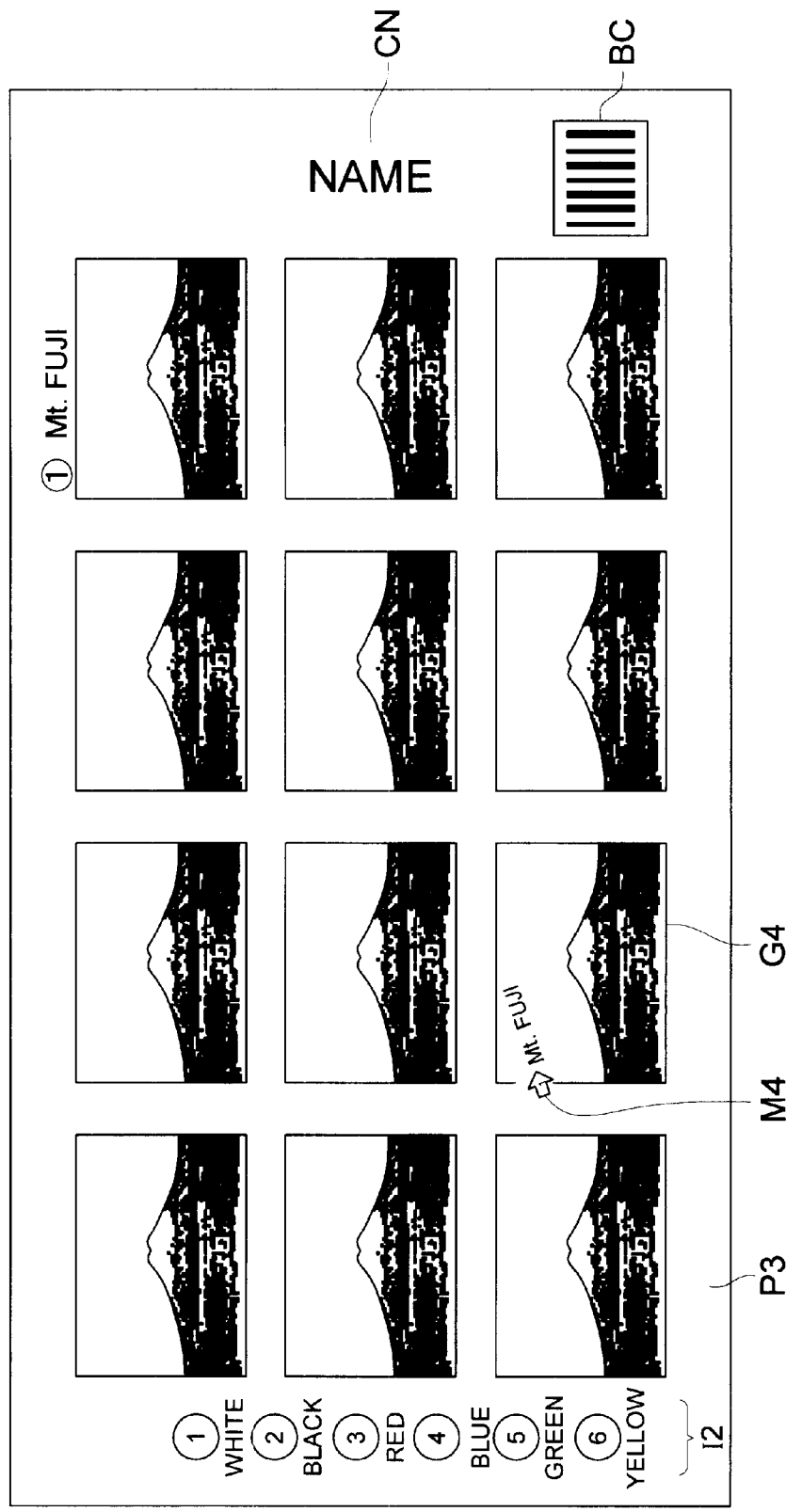
FIG. 8 is a drawing representing an example of another guide print in the second embodiment.
Figure 9:
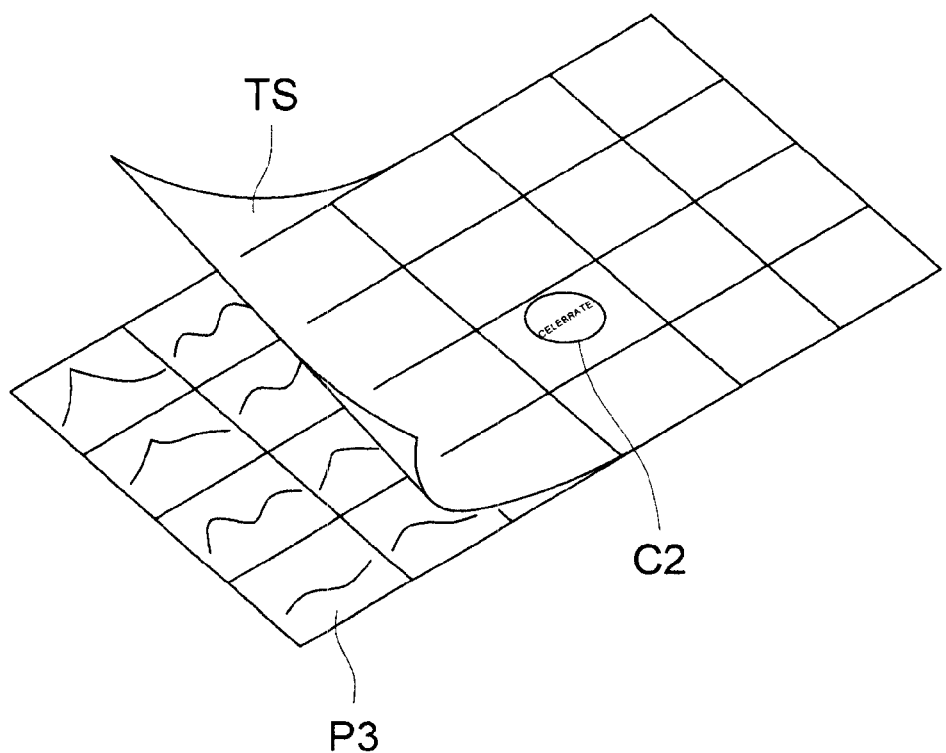
FIG. 9 is a drawing representing a guide print and a medium of the image consisting of a transparent sheet in the second embodiment.

FIG. 7 shows an example of the image medium representing a variation of the present embodiment. On the guide print P3 as a print portion, a sheet TS as a transparent material is arranged with the right end fixed, namely, in a positioned state. A guide print P3 is formed in conformity to the silver halide film (negative) the customer has submitted to the photofinishing lab. After that, the sheet TS is fixed to serve as an image medium. The customer having received such an image medium has only to enter the character C2 in the transparent sheet TS if he wishes that the character including the above-mentioned date is inserted.

On the other hand, the operator of the photofinishing lab having received the image medium where the character C3 is written by the customer separates between the guide print P3 and sheet TS, and sets only the sheet TS to the reflective original input apparatus 210 of the printer 20. This ensures the reflective original input apparatus 210 to read out the character C2 clearly even when the character is written on the black image with a black pen. Further, if the character is written in a color other than black using a color pen, the color can also be read. This provides an advantage that there is no need of writing information on color in terms of numerals.

This invention has been explained with reference to embodiments. It should not be understood that the present invention is limited only to the above embodiments. It goes without saying that the invention can be modified and improved as appropriate whenever required. For example, when a floppy disk (image medium) recording the image as in the case of the guide print is handed over to a customer by the photofinishing lab, the customer can use his own personal computer or a personal computer of the photofinishing lab can enter a desired character in the recorded image. If the floppy disk D containing these entries is carried into the photofinishing lab, the printer 20 can produce the photographic print desired by the customer.

The present invention provides a photographic print producing method which ensures a photographic print assigned with such a character as date and letter.

Figure 10:
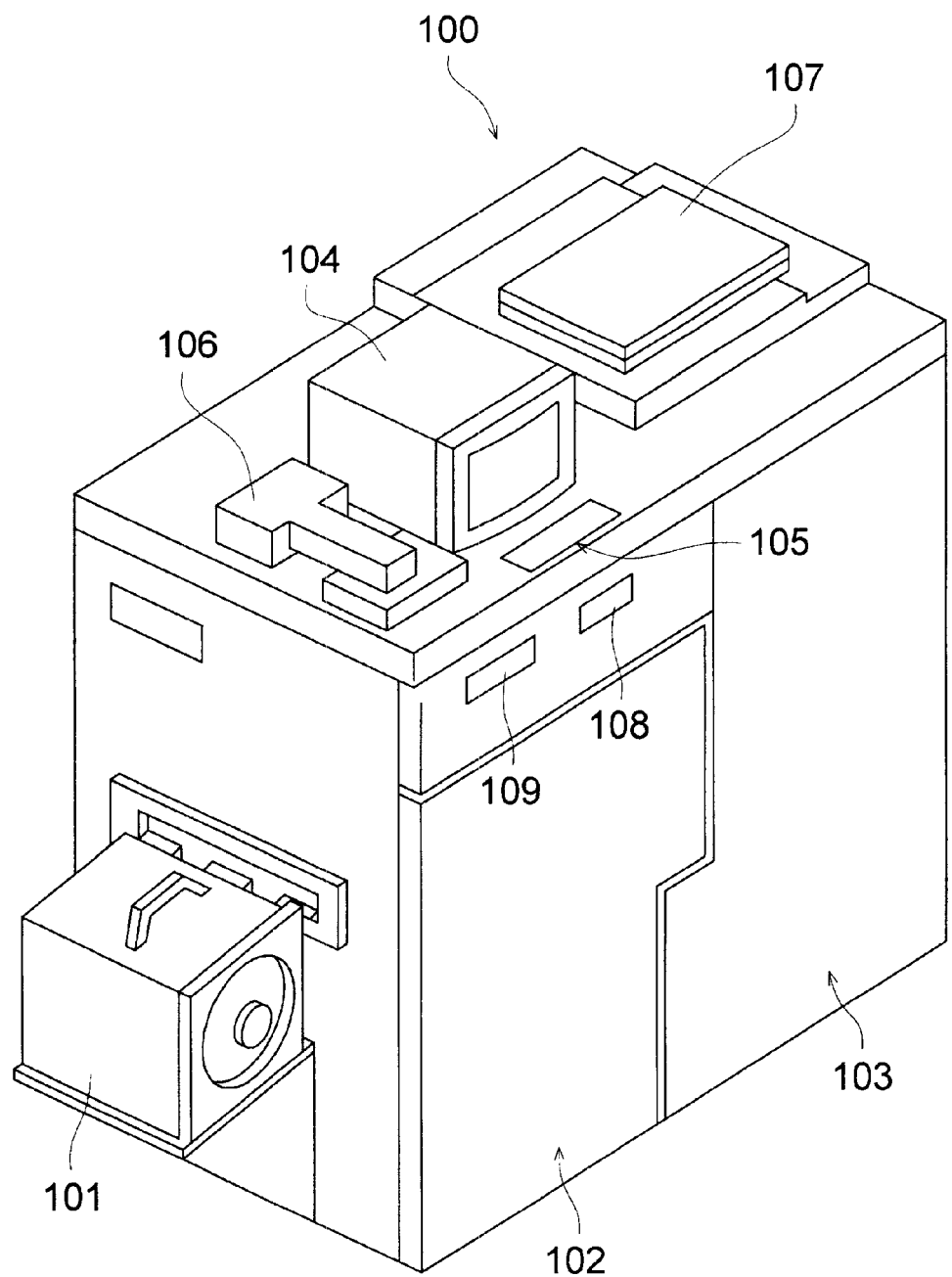
FIG. 10 is an oblique view representing an example of an image forming apparatus.
Figure 11:
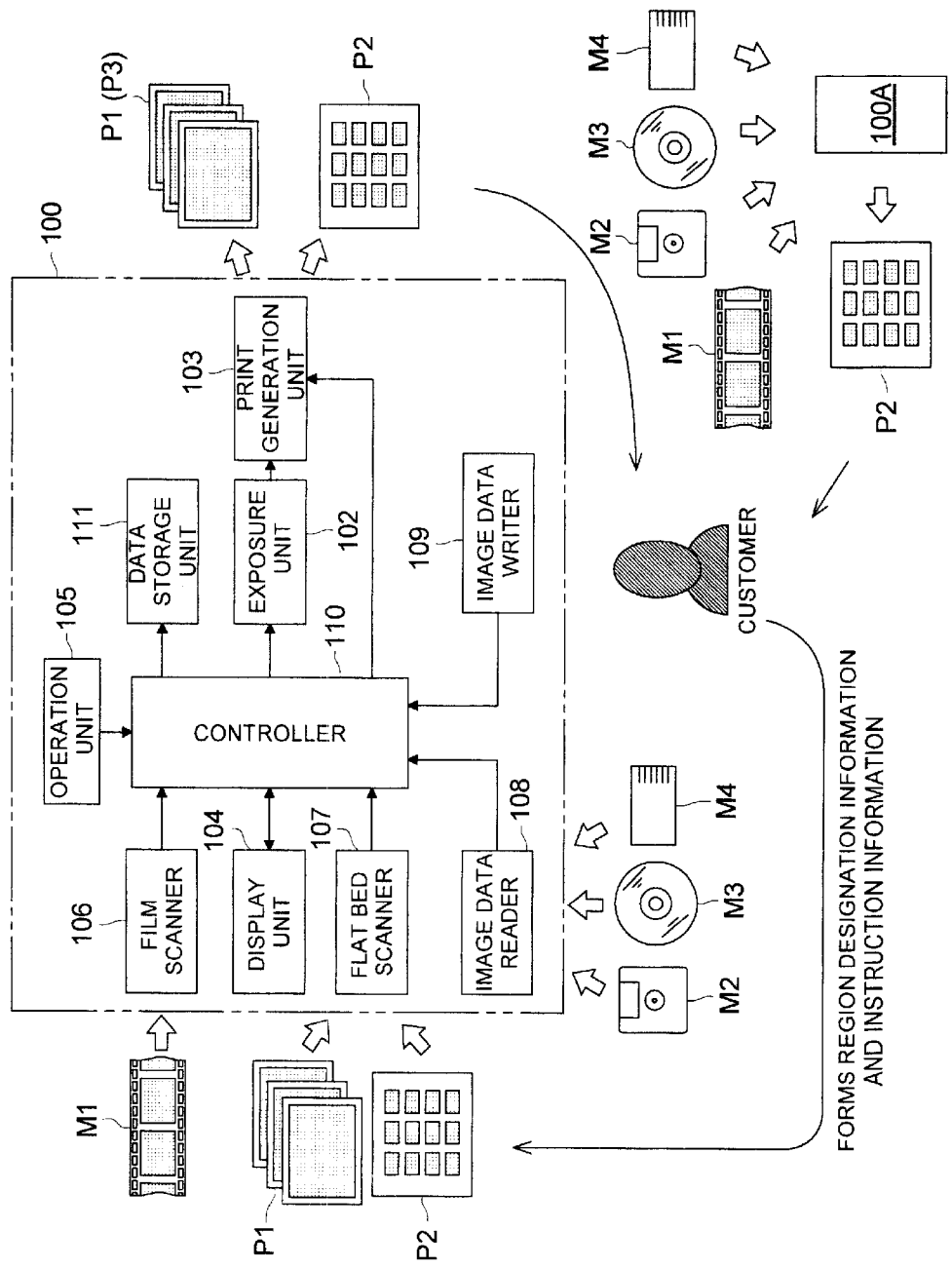
FIG. 11 is a block configuration diagram representing an image forming apparatus.

The following describes the details of still another embodiment of the present invention:

With reference to FIGS. 10 and 11, the following describes the overview of the image forming apparatus preferably employed when implementing the photographic print producing method according to the present invention.

FIG. 10 is an oblique view representing an example of an image forming apparatus. It comprises an exposing means for exposure on a silver halide photographic photosensitive material as the image forming apparatus 100. It shows an example of a printer processor for silver halide photographic photosensitive material which produces a photographic print by developing the silver halide photographic photosensitive material exposed by this exposing means.

A rolled paper storage magazine 101 for storing the roll-shaped photographic paper for color photographing as an unexposed silver halide photographic photosensitive material is set on the side of the apparatus proper. Upon receipt of an exposure signal trigging the start of exposure, photographic paper in this magazine 101 is pulled out a specified length. After the image is exposed to a specified position based on the image data in the exposure unit 102, paper is cut to a specified size by a cutter (not illustrated) and is fed to a print generation unit 103. After specified development and drying are performed in the print generation unit 103, paper is ejected out of the apparatus as a photographic print.

A display unit 104 for screen display of image data to the operator is arranged on the top of the apparatus proper. A CRT monitor or liquid crystal monitor can be used as this display unit 104. When the work is done by the operator, various types of input operations are performed by key entry on an operation unit 105 which is also arranged on the apparatus proper, or by touching operation on the touch panel.

A film scanner 106 and flat head scanner 107 as image reading means are arranged on the top of the apparatus proper, with a display unit 104 sandwiched in-between. The film scanner 106 is designed to scan the film as an image recording medium made of a photosensitive material for photographing of the negative and positive film with an image on a transmissive support, thereby reading the image and converting it into digital image data. Further, the flat head scanner 107 is used to read the photographic print as an image recording medium with an image on a reflective support and reflective original such as a guide print to be described later, thereby converting it into digital image data. Further, on the front of the apparatus proper there is provided an image data reader 108 as a reading means for reading digital image data from the image recording medium (floppy disk, CD-ROM and CD-R, CD (compact disk), MO (magnetic optical disk), memory chip, etc.) where digital image data is recorded. It may be equipped with a means for directly reading the digital image data stored therein by being connected with an electronic camera (so-called digital camera). Image data read by a film scanner 106, flat head scanner 107 and image data reader 108 as these reading means is displayed on the screen of the display unit 104.

On the front of the apparatus proper there is an image data the writer 109 for writing the output digital image data in various types of image recording media capable of recording the aforementioned digital image data. The image data reader 108 may serve as this image data the writer 109.

FIG. 11 is a block configuration diagram representing an image forming apparatus.

The controller 110 controls the film scanner 106, flat head scanner 107 and image data reader 108 according to the input instruction information given by the input operation of the operator performed from the operation unit 105. It reads various types of image data, obtains image data from them and displays such data on the display unit 104. The read image data is sent to a data storage unit 111 where it is stored.

The controller 110 comprises an image processing means. Image data is subjected to image processing through instruction operation performed from the operation unit 105 by the operator, and is sent to the exposure unit 102. In the exposure unit 102, image is exposed on the photographic paper according to the image data. Then development and drying are performed in the print generation unit 103, then the image recorded in the image recorded in various types of image recording medium M such as photographic print P1 and film M1 is recorded as a frame image, thereby producing a guide print P2 for providing a guide display in the form of a list for a glance showing multiple images recorded in the image recording medium. Image data sent to this exposure unit 102 subsequent to image processing can be sent to the image data the writer 109, and can be stored into various types of image recording medium from here, as required.

Third Embodiment

The following describes the photographic print producing method wherein a photofinishing lab produces a photographic print by trimming the image in response to the request of a customer.

Figure 12:
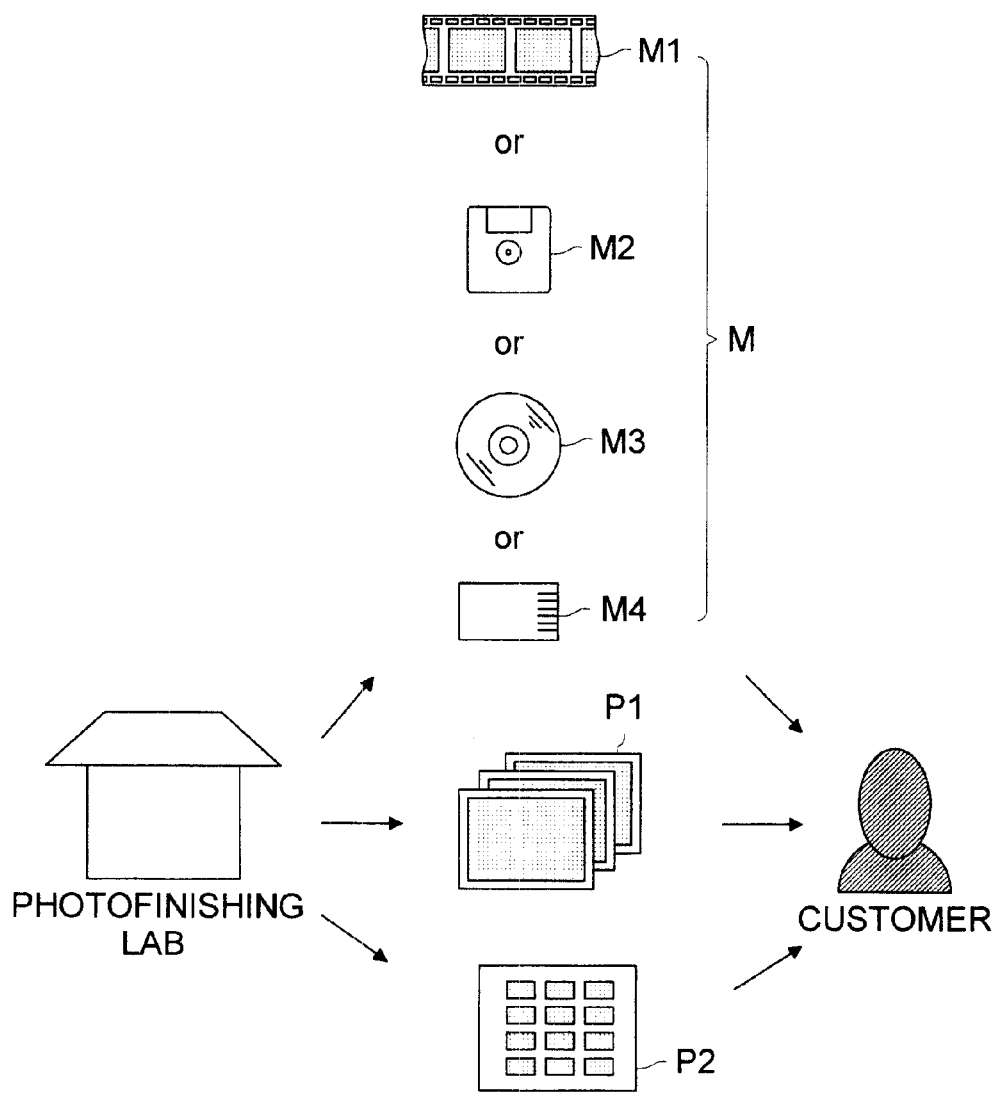
FIG. 12 is a drawing illustrating a customer requesting a photofinishing lab to produce a photographic print.

When an operator of a photofinishing lab has received a silver halide photographic film containing a subject from the customer, he develops the film and creates a photographic print P1 using the aforementioned image forming apparatus 100 according to the negative/positive film M1 as an image recording medium M and image information recorded on the film M1. When he has received an image recording medium M recording the digital data of the image taken by an electronic camera, e.g. CDM3 such as floppy disk M2, CD-ROM and CD-R, memory chip M4 or M0 (not illustrated), he produces a photographic print according to the image information using the aforementioned image forming apparatus 100. In the same way, multiple images corresponding to image information recorded in the aforementioned image recording medium M are recorded as frame images, whereby a guide print P2 for providing a guide display in the form of a list for a glance showing the data recorded in the image recording medium M is also created using the aforementioned image forming apparatus 100. This guide print is also handed over to the customer. Then the customer receives such CDM3 as floppy disk M2, CD-ROM and CD-R, memory chip M4 or M0 (not illustrated) and the image recording medium M containing the image information (film M1, CDM3 such as floppy disk M2, CD-ROM and CD-R, memory chip M4 or M0) (FIG. 12).

Examining the multiple photographic prints P1 received from the photofinishing lab, the customer desires a specific site in one or more images of them to be trimmed. In this case, the customer himself records and forms designation information about his desired trimming region directly on the screen thereby notifying his designation to the photofinishing lab. In this case, the image used to notify designation to the photofinishing lab may be the photographic print P1 per se where the image to be trimmed is contained, but the aforementioned guide print P2 is preferably used in the sense that the image in the aforementioned image information can be easily specified simultaneously.

Figure 15:
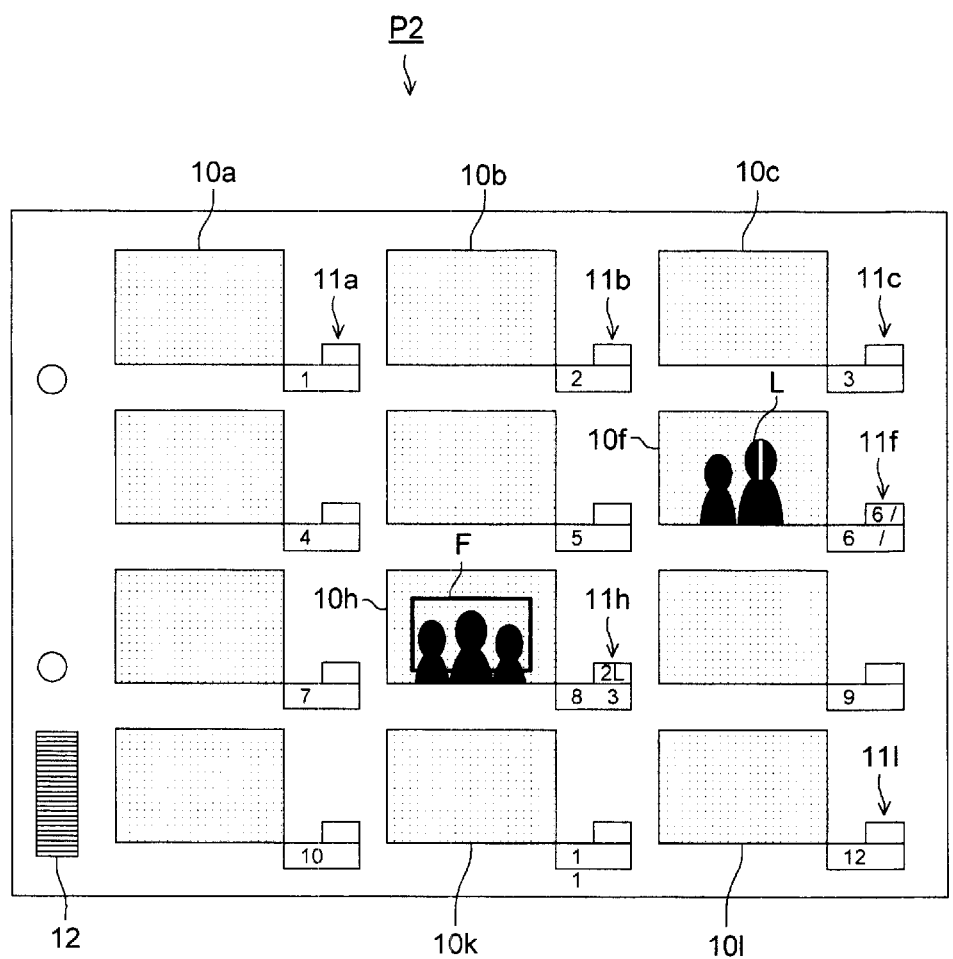
FIG. 15 is a plan view of a guide print in the third embodiment.

The details of guide print P2 are given in FIG. 15.

The guide print P2 makes it possible to confirm the data recorded in the image recording medium M such as film M1 in the form of a list for a glance. It is created to guide the data of the image recording medium M, and is supplied to the customer.

The image created according to multiple pieces of image information recorded in the image recording medium M is displayed as frame image 10 in the form of a list for a glance on the photographic paper. In this case, a total of twelve (3 pieces by 4 rows) frame images 10a to 10l are displayed. Thus, the customer can easily confirm the data of image information recorded in the image recording medium M in the form of a list for a glance. At the same time, this guide print P2 assists the photofinishing lab to monitor the image information in the image recording medium M easily.

The number of the frame images 10 is not restricted to the one given in the Figure. However, if too many frame images are displayed in the form of a list for a glance, individual size will be reduced. When the silver halide film (negative) 36 images are recorded for example, it is desirable to produce three separate guide prints P2 where twelve frame images are displayed.

Each frame image 10 comprises a corresponding instruction information writer 11 (11a to 11l). Each instruction information writer 11 allows the customer himself or the photofinishing lab at the request of the customer to enter instruction information regarding the number of prints and print size of the frame image 10 desired by the customer. If the customer enters the instruction information on the number of prints and print size, the information on the number of prints and print size is conveyed to the photofinishing lab without fail. According to the illustrated configuration, the instruction information writer 11 is made up of a rectangular frame provided for each frame image 10, without being restricted thereto. So long as the correspondence to each frame image 10 is clear, only the instruction information writers 11 can be collectively installed in one position. Further, an underline, parenthesis or others can be used for the instruction information writer 11 so long as the write region can be demarcated. Either the number of prints or print size can be given as instruction information.

Any desired writing tool such as a ball-point pen, felt-tippled pen or pencil can be used as a writing tool. When consideration is given to the possibility that the trimming region designation information is directly formed on the frame image 10 using a writing tool in the same way as will be described later, the guide print P2 is preferred to be made of a material which permits rewriting with a writing tool on the surface where each frame image 10 is displayed. This is intended to ensure that once written instruction information can be easily erased and rewritten.

Unlike the normal lustrous print paper, the rewritable material has its surface matte-finished, and is treated to incorporate various surface conditions for ensuring a sufficient deposition of ink of a pencil lead and ball-point pen. Such a rewritable material should be used in the area of at least the frame image 10 and instruction information writer 11.

A barcode 12 recording the medium specific information is provided on the surface of this guide print P2. This medium specific information is defined as information for recognizing identity with the image recording medium M, e.g. film M1, where the image displayed on the guide print P2 is originally recorded. It includes the ID number (member number) of the owner of the image recording medium M (customer) and the ID number (membership number) assigned to each image recording medium M. This information is indicated in terms of barcode so that it can be automatically read when the guide print P2 is read from the flat head scanner 107. It is then compared with the identification information on the part of the image recording medium M such as film M1 which is read from the reading means such as film scanner 106, whereby identify between the two is automatically confirmed. This medium specific information is not restricted to what is recorded as illustrated barcode. Information of any form will do if it can be automatically read and identified by the reading means.

In this guide print P2, the numerals recorded in each instruction information writer 11 are frame numbers. The sequence of this frame numbers agree with that of the images recorded in the image recording medium M. These numbers allows the same images in the image recording medium M to be specified. These frame numbers are automatically identified when the guide print P2 is read by the flat head scanner 107.

It should be noted that this guide print P2 is not restricted to the one provided by the photofinishing lab. For example, the following can be considered: A reading means capable of reading the negative/positive film M1, floppy disk M2 recording the image data obtained by an electronic camera, and image recording medium M such as CDM3, memory chip M4 and M0 is provided. Then an image forming apparatus 100A (FIG. 11) capable of producing the guide print P2 according to the image data read by this reading means is prepared. This apparatus is installed at the counter of the photofinishing lab as well as in such places providing easy access to customers as a convenience store, a plaza in front of the station, various types of amusement facilities including a game center and amusement park, a shop front of a souvenir shop in a sightseeing spot and pleasure resort, and the service area of an expressway. Using this image forming apparatus 100A, a customer can set his own image recording medium M, and gets only the guide print P2 separately. This can be used when he requests the photofinishing lab for trimming.

The following describes the case of producing a trimmed photographic print using the aforementioned guide print P2.

Figure 13:
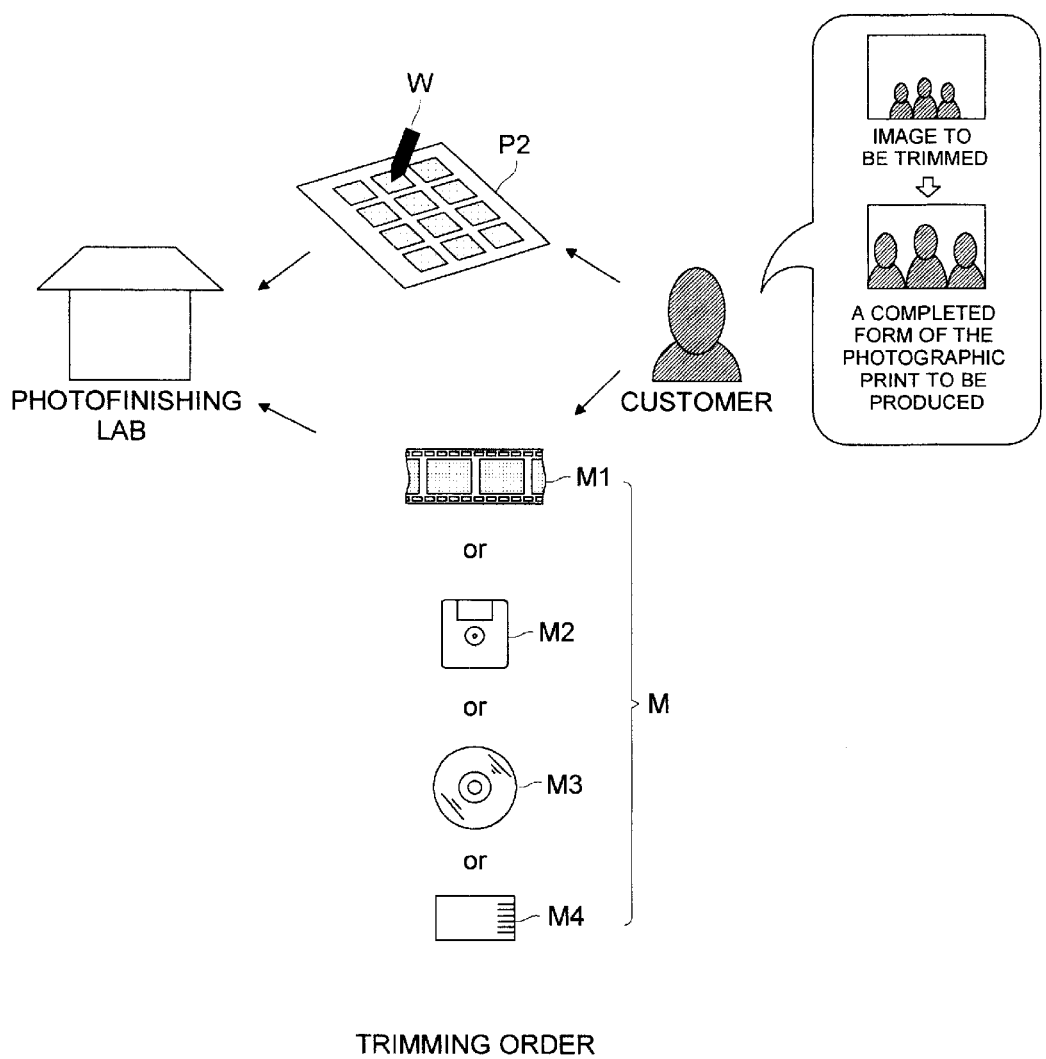
FIG. 13 is a drawing illustrating a customer requesting a photofinishing lab for trimming.

The trimming region designation information of the guide print P2 can be formed by the customer himself directly entering it on the frame image 10 using a ball-point pen, felt tipped pen, pencil or any desired writing tool W (FIG. 13). A line or symbol which clearly defines the range of trimming is preferably used to indicate the trimming region designation information. To put it more specifically, a straight line indicating the rectangular frame line and four sides of the region can be mentioned as this line. An angle bracket or dot indicating the four corners of the region or two diagonal corners can be mentioned as this symbol. FIG. 15 shows that the trimming region designation information is formed on the eighth frame image 10h by the customer using the rectangular frame line F. As can be seen, the customer gives to the photofinishing lab the guide print P2 where the trimming region designation information (frame line F) is formed on the frame image 10h and the image recording medium M (film M1, floppy disk M2, CDM3, memory chip M4, M0, etc.) recording the same image information as the image recorded in his frame image 10h, and requests the trimming photographic print to be produced (FIG. 13).

The operator of the photofinishing lab in response to the request by the customer sets the image recording medium M supplied by the customer to the corresponding reading means of the image forming apparatus 100, e.g. to the film scanner 106 in the case of film M1. At the same time, the operator sets the guide print P2 supplied by the customer to the flat head scanner 107. They are each read automatically (FIG. 11). In this way, the trimming region designation information is read from the guide print P2. In this case, the medium specific information is read from the barcode 12 provided on the guide print P2. At the same time, this information is compared with identification information read from the image recording medium M to confirm identity between the two. This step makes it possible to get digital image data according to image information recorded in the image recording medium M and digital image data according to image information recorded in the guide print P2.

Here the frame image 10*h* recording the frame line F as trimming region designation information is designated by image processing of the image data obtained from the guide print P2 and converted into digital form in the image forming apparatus 100, without intervention of the operator.

This frame image 10*h* can be designated by the operator of the photofinishing lab, who makes visual observations of the guide print P2, identifies the frame image 10*h* where frame line F is formed and gives input instruction from the operation unit 105 of the image forming apparatus 100. But the frame image 10*h* can be specified automatically and this method ensures excellent workability. So this is preferred to be automatically performed by identifying the presence of the frame line F on the frame image 10*h* or the presence of the entry in the instruction information writer 11*h* corresponding to the frame image 10*h*, as aforementioned. A known image processing art can be used in the aforementioned image processing.

The same image (original image) as the frame image 10*h* is selected from the image recording medium M by identification of this frame image 10*b*. The image from image recording medium M can be automatically selected by identifying through image processing of the frame number assigned to the identified frame image 10*h* and selecting an image in the image recording medium M from that frame number.

In the image information (image information of the same original image as frame image 10*h*) of the identified image recording medium M, the region where a photographic print is produced is automatically determined according to the region designated by the frame line F formed on the frame image 10*h*, and the region is extracted by processing of the image data.

Figure 16:
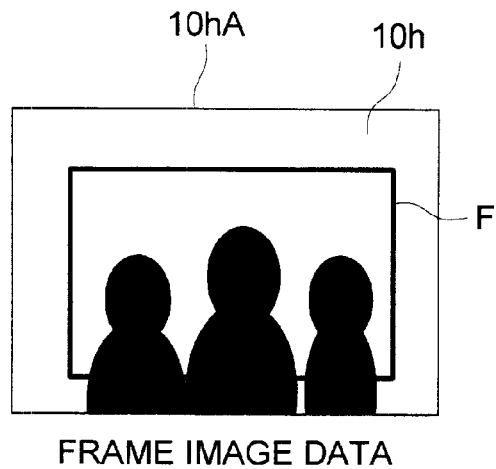
FIG. 16(a) is a drawing representing the image data of a frame image.
FIG. 16(b) is drawing showing the image data extracted from the original image.
Figure 16:
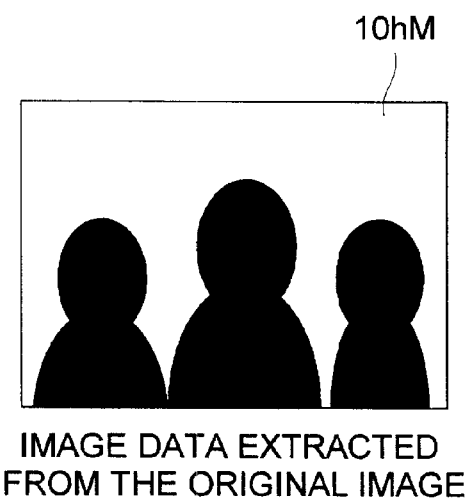

This processing of determination can be made as follows: The size and position of the frame line F formed on the frame image 10*b* with respect to the image frame 10*b*A of the frame image 10*b*, based on the image data based on frame image 10*h* gained from the guide print P2 are automatically calculated by image processing, as shown in FIG. 16(*a*). Based on the region information regarding the calculated size and position the same region 10*h*M as the frame line F is extracted from the image data based on image recording medium M, as shown in FIG. 16(*b*), whereby the aforementioned processing of determination can be made. A known image processing art can also be used in the aforementioned image processing.

As described above, the region 10*h*M extracted from image data based on the image recording medium M is used as image data for producing a photographic print. This image data 10*h*M is output to the exposure unit 102, whereby a photographic print P3 is produced by the print generation unit 103.

Figure 14:
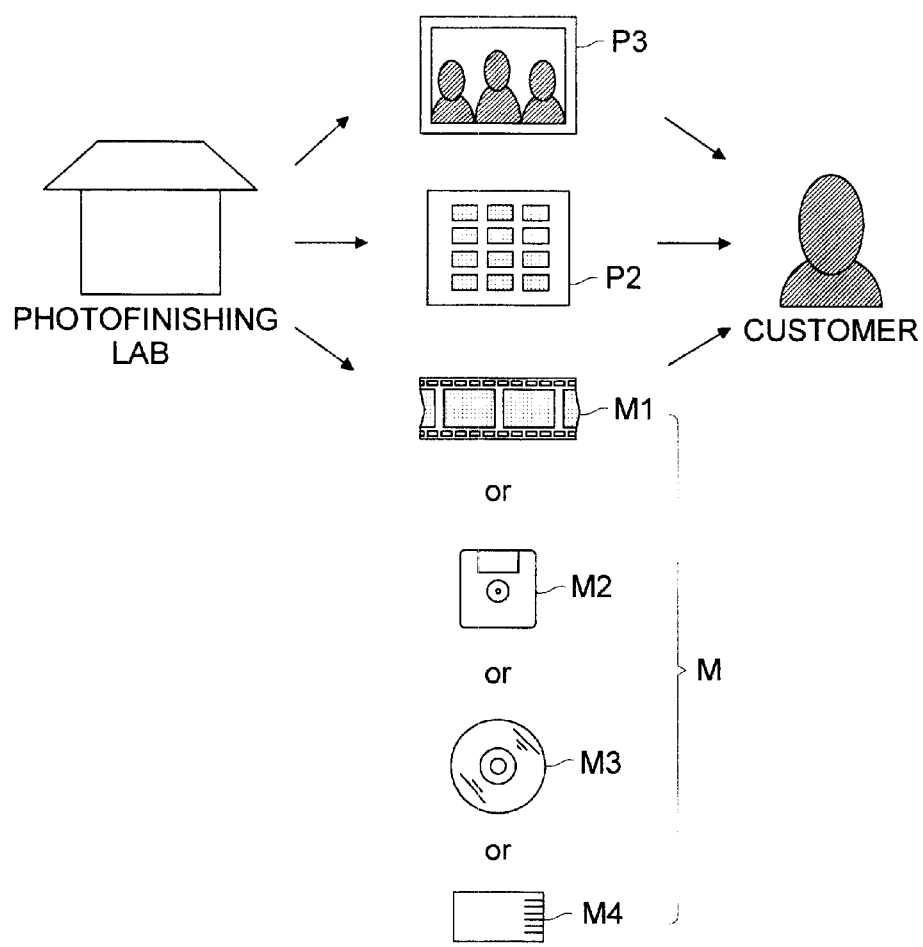
FIG. 14 is a drawing illustrating trimming of a photographic print having been completed by photofinishing lab.

The image processing apparatus 100 provides image processing of the instruction information written in the instruction information writer 11*h* corresponding to the frame image 10*h* of the guide print P2 when the guide print P2 is read in advance, thereby obtaining information on the number of prints and print size specified therein. Then based on instruction information, the photographic print P3 provided with trimming in conformity to the designation information (frame line F) of the trimming region is automatically produced in the number of prints and print size desired by the customer, when the photographic print P3 is produced. The work of the photofinishing lab is now complete when this photographic print P3, the guide print P2 and image recording medium M such as film M1 received from the customer have been returned to the customer (FIG. 14).

As described above, the guide print P2 where trimming region designation information (e.g. frame line F) is directly formed on the frame image 10 by the customer and the image recording medium M such as film M1 recording the original image of the frame image 10 are read into the image forming apparatus 100. Merely by this step, image processing of the digital image data obtained from each of them is automatically carried out. A photographic print P3 provided with trimming in conformity to trimming region designation information created by the customer himself can be easily produced, without intervention of a photofinishing lab operator. Especially when information on the number of prints and print size is specified on the guide print P2, such information can also be obtained automatically by image processing. So merely by setting the guide print P2 and image recording medium M on the image forming apparatus 100, photographic prints P3 can be produced without any operation in the number of prints and print size required by the customer. Thus, this method ensures easy production of a photographic print P3.

According to the above steps, image recording medium M provided by the customer is set on the reading means of the image forming apparatus 100 in order to get image information corresponding to the image designated by the guide print P2, so that image information can be read therefrom. It is also possible to get the information in the follow manner: Image information is stored in advance in the data memory of the image forming apparatus 100 or in the database (not illustrated) connected to permit communications of data with the image forming apparatus 100. Thus, the information can be obtained by reading the image information corresponding to the image designated by the guide print P2 or the like from the aforementioned data memory or database. In this way, the photofinishing lab gets image information in advance for each customer through registration of membership at the time of first visit of the customer to the shop, and keeps in storage image information stored in the aforementioned data memory or database. Thus, trimming work can be started without asking the customer to submit image recording medium M such as film M1, hence, without having to read the image recording medium M.

In the aforementioned explanation, production of the photographic print P3 is performed by image processing of the image data according to image information on the side of the image recording medium M such as film M. Without using such an image recording medium M, the photographic print P3 can be produced by image processing of image data per se obtained from print (photographic print P1 and guide print P2) where the trimming region designation information received from the customer is formed on the image.

The following describes the production method in cases where the aforementioned print is a guide print P2. In this case, these following steps are the same as described above: The guide print P2 where trimming region designation information (frame line F) is formed by a customer on the frame image 10 is read from the flat head scanner 107 of the image forming apparatus 100, and the digital image data based on the image information of the designated guide print P2 is obtained, thereby obtaining the specification of the frame image 10h where the frame line F is formed and instruction information on the specific number and print size.

As shown in FIG. 16(a), the image within the region enclosed by the frame line Formed on the frame image 10h is automatically extracted by image processing of the image data of the frame image 10h gained from the guide print P2. According this method, the image data in this extracted region serves as image data for photographic print production, and photographic prints P3 can be produced in the number of prints and print size required by the customer through the print generation unit 103 by outputting this extracted image data to the exposure unit 102.

According to this method, there is no need of using the image recording medium M, and this eliminates the work of reading the image recording medium M and saves the cost for the storage and management of the data until return to the customer. Thus, this method allows the photofinishing lab to simplify work. Further, the customer is allowed to request production of the trimming photographic print using the photographic print and guide print. The customer is allowed to request such production even if he has lost an image recording medium M such as film M1 or image information corresponding to the designated image information is not kept by the photofinishing lab because his membership is not yet registered at the photofinishing lab.

The following describes the photographic print producing method especially preferable when a portrait photographic print is produced by trimming the human face formed on the photographic print P1:

The following describes the production method when the guide print P2 is used: The guide print P2 where trimming region designation information formed on the frame image 10 by the customer is read from the flat head scanner 107 of the image forming apparatus 100 get the image data, thereby obtaining the specification of the frame image 10 where the designation information is formed and the instruction information on the number of prints and print size. At the same time, the image recording medium M such as the film M1 where information of the original image is recorded is read from the reading means of the film scanner 106 of the image forming apparatus 100, thereby getting image data. Then the same image as the aforementioned frame image 10 therefrom is selected. These series of steps are the same as these of the aforementioned method.

The face designation information created by a line showing the longitudinal or lateral length or by the line along the profile of a human face in the image is preferred as designation information of the trimming region formed by direct entry on the frame image 10 by the customer. This is because these lines are both simple lines, and entry of the designation information is much simplified. In the face of a specific person recorded in the sixth frame image 10f of the guide print P2 of FIG. 15, the face designation information is formed by the longitudinal line written by the customer.

Then the image data based on image information (information on the same original image as the frame image 10f) in the specified image recording medium M such as film M1 is subjected to image processing, and the region designated by line L formed on the frame image 10f in this image, namely, the region produced as a photographic print is automatically determined.

Figure 17:
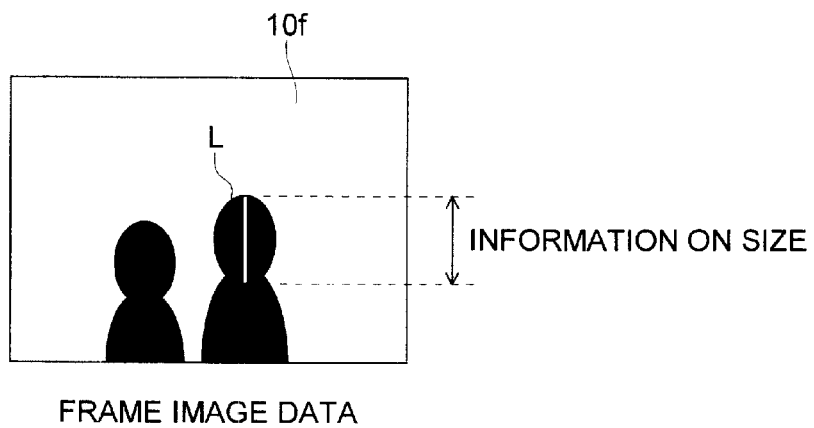
FIG. 17(a) is a drawing representing the image data of a frame image.
FIG. 17(b) is drawing showing the image data extracted from the original image.
Figure 17:
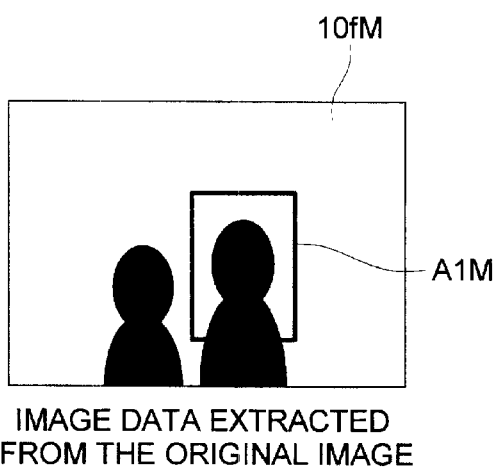
Figure 18:
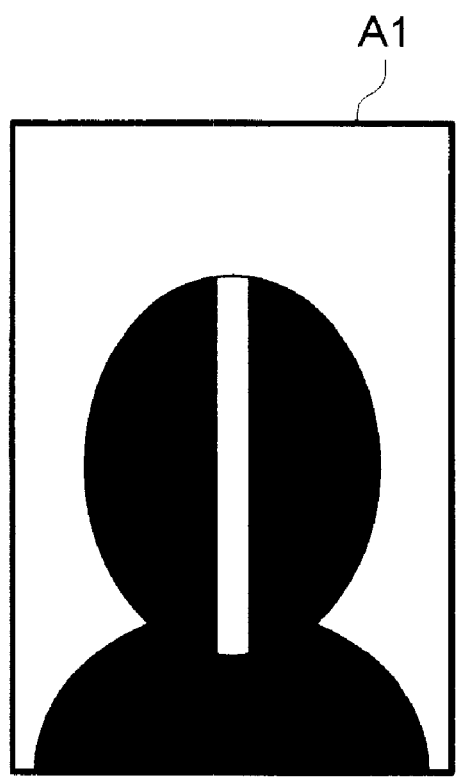
FIG. 18 is a drawing representing the size and layout of the face with respect to image frame set on an image forming apparatus.

This processing of determination can be performed as follows:

As shown in FIG. 17(a), the position of the top end and bottom end of the line L formed on the frame image 10f are calculated from the image data the frame image 10f obtained from the guide print P2, and information on the length or height is automatically obtained. This information on the length or height of the line L serves as size information representing the size of the human face.

On the other hand, information on the size and layout of the human face with respect to image frame A1 at the time of producing a photographic print is set in the image forming apparatus 100 in advance and is stored therein, for example, as shown in FIG. 14. It shows that the human face is laid out in a large size approximately at the center of the image frame A1 in portrait orientation. Such a configuration is not restricted to one type. For example, the image frame may be laid out in landscape orientation or multiple configurations are set in advance with different sizes and arrangements of a human face so that free selection among these configurations is permitted. In the image forming apparatus 100, the optimum configuration may be automatically selected according to the aforementioned size information.

Based on the size information of the human face obtained by image processing of the aforementioned frame image 10f, decision is made by automatic extraction of the included region AIM in terms of the size and arrangement of the image frame A1 where the designated human face is preset in the image forming apparatus 100, from image data 10fM selected among the image recording media M, as shown in FIG. 17(b).

In this way, region AIM extracted from the image data 10fM in the image recording media M serves as an image data for producing a photographic print. By outputting this image data AIM to the exposure unit 102, photographic prints P3 are produced in the number and size desired by the customer by means of a print generation unit 103.

According to this method, region designation method is very simple. By trimming a specific human face from the photographic print including the human face, the portrait photographic print can be easily produced without intervention of an operator.

Figure 19:
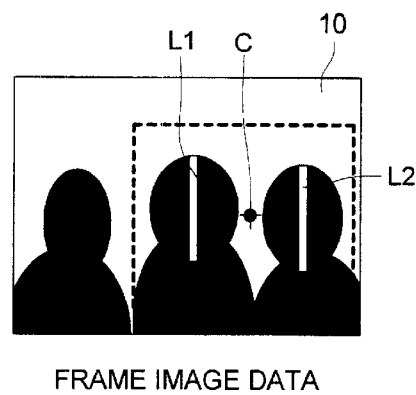
FIG. 19(a) is a drawing representing the image data of a frame image.
FIG. 19(b) is drawing showing the size and layout of the face with respect to image frame set on an image forming apparatus.
Figure 19:
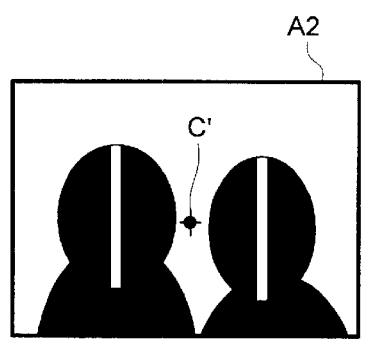

A specific human face in the image is not restricted to one person. It may consist of many human faces. For example, it is possible to produce a two-shot photographic print by trimming a specific human face in the image. In this case, as shown in FIG. 19(a) for example, lines L1 and L2 denoting length along the approximate center of the face of each of specific two persons recorded in the frame image 10 of the guide print P2 are drawn in the longitudinal direction, thereby forming face designation information. In addition, the line may be a line tracing each face profile or a line denoting the width of the face along the approximate center of the face.

On the other hand, as shown in FIG. 19(b), the information on the size and layout of two human faces with respect to the image frame at the time of producing a photographic print is set in the image forming apparatus 100 in advance and is kept in storage. Here the central position C' of two human faces is laid out in greater size approximately at the center of the image frame A2 in landscape orientation. As previously described, it is also possible to allow free or automatic selection from among multiple configurations with different orientations of the image frame and the different sizes and orientations of two human faces. The virtual central position C is automatically calculated by reading vertical lines 11 and L2 written on the frame image 10. The region (indicated by a dotted line in FIG. 19(a)) wherein lines L1 and L2 as face designation information are laid out in size with respect to preset image frame A2 is automatically determined so that the virtual central position C agrees with central position C' in the image frame A2. After that, based on image data of the determined region, a two-shot photographic print can be easily produced according to the aforementioned method.

Figure 20:
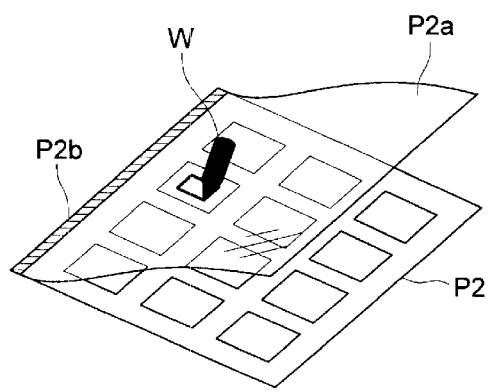
FIG. 20 is an oblique view showing another embodiment of the print.

The following describes the photographic print P1 where region designation information for designating the trimming region and instruction information on the number of prints and/or print size are described, guide print P2 and prints of other configurations:

A transparent material which is so transparent that the image is identifiable is laid on top of the surface of the print of other configuration. This will be explained in the case of the guide print P2 with reference to drawings. As shown in FIG. 20, it has approximately the same size as the guide print P2, and is positioned with respect to the image recorded on the guide print P2. Further, a transparent material P2a made of the material which allows rewriting with a writing tool W is laid on top of it. With this transparent material P2a laid on top of the guide print P2, it is assumed that region designation information for designating the trimming region, instruction information and other various types of information can be directly written on the transparent material P2.

Unlike the normal lustrous print paper, the rewritable material has its surface matte-finished, and is provided with surface conditions for ensuring a sufficient deposition of ink of a pencil lead and ball-point pen.

Since such a rewritable transparent material P2a is used, various types of information are not directly entered in the guide print P2 per se or in the photographic print P1 per se in the case of photographic print P1. This prevents the guide print P2 or photographic print P1 from being contaminated.

It is preferred that the transparent material P2a is integrally bonded with the guide print P2 only in one end P2b of the guide print P2 in order to ensure that the transparent material P2a can be freely wound on the surface of the guide print P2 in the positioned state. In this bondage, it is preferred to use an adhesion means which allows easy adhesion with the guide print P2 and separation therefrom, because the transparent material can be bonded with the guide print P2 as required, and various types of information can be entered. When it is not necessary, it can be separately easily and discarded. Such a transparent material can be used for the photographic print P1 exactly in the same way.

Figure 21:
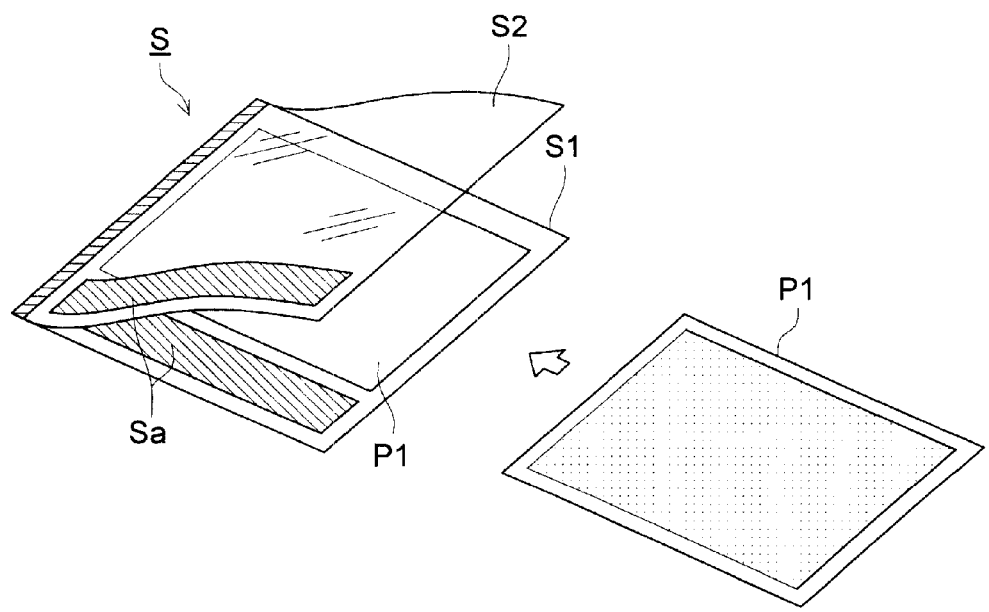
FIG. 21 is an oblique view showing still another embodiment of the print.

Further, the print of another configuration uses an auxiliary tool S which makes it possible to directly write region designation information for designating the trimming region, instruction information and various other types of information, as shown in FIG. 21. In this auxiliary tool S, the support plate S1 and the transparent material S2 made of the material which allows rewriting with the writing tool W are bonded on one end. Such a print as photographic print P1 and guide print P2 can be held between them. The Figure shows that the photographic print P1 is held between them. The image recording surface of the aforementioned photographic print P1 and guide print P2 is laid out on the side of the transparent material S2, with the auxiliary tool S sandwiched between them, thereby ensuring that region designation information for designating the trimming region, instruction information and other various types of information can be directly written on the image of the rewritable transparent material P2.

This auxiliary tool S is formed in such a way that the support plate S1 and transparent material S2 is formed slightly greater in size the photographic print P1 when the print held by it is photographic print P1, as illustrated. Then a protrusion Sa greater than the photographic print P1 is formed when the photographic print P1 is sandwiched in-between, and instruction information on the number of prints, print size and the like on this protrusion Sa in the transparent material S2. This method is preferred.

As described above, the print such as photographic print P1 and guide print P2 is held by the auxiliary tool S and is set on the flat head scanner 107 of the image forming apparatus 100 so that image information set there can be read.

The aforementioned auxiliary tool S can be used as required. Therefore, the photographic print P1 and guide print P2 need not be provided with a transparent material from be beginning. Time and effort need not be wasted to bond or remove the transparent material. Moreover, trimming region designation information, instruction information on the number of prints or other various types of information are not directly written on the photographic print P1 and guide print P2 per se. This prevents photographic print P1 or the guide print P2 from being contaminated.

Figure 23:
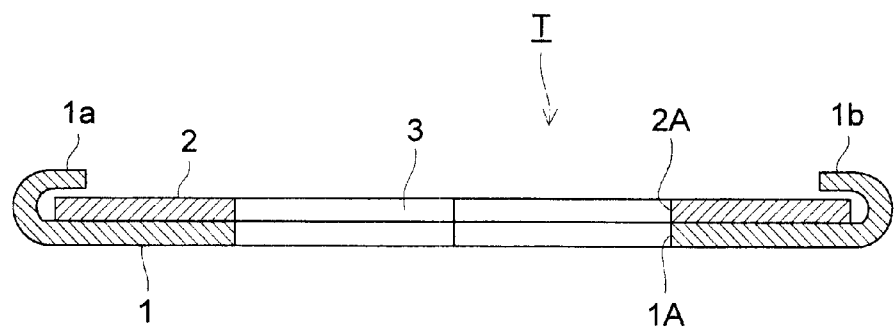
FIG. 23 is a cross sectional view along the line I—I.
Figure 24:
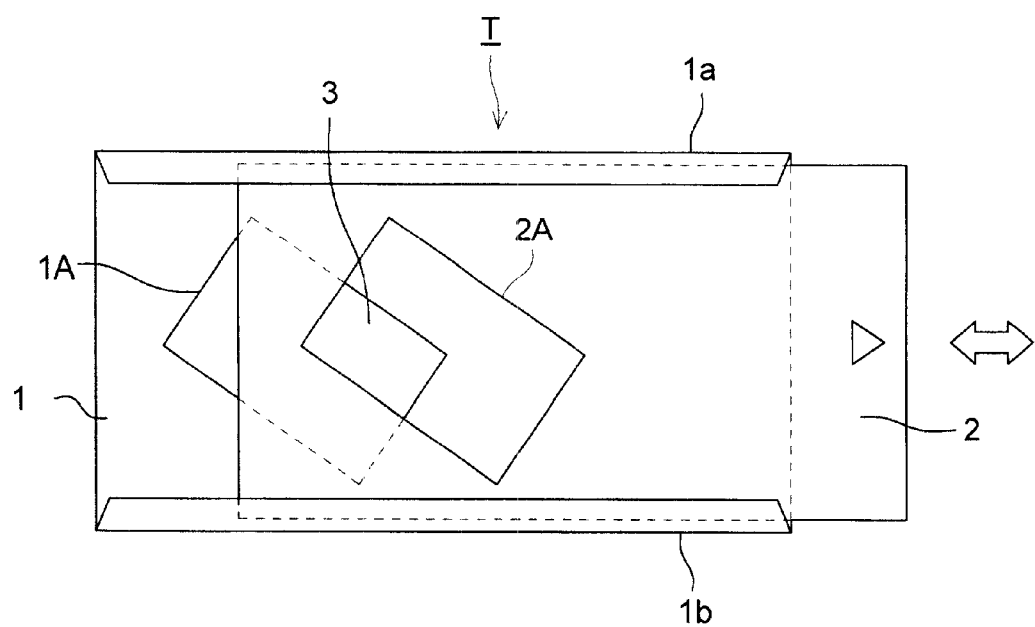
FIG. 24 is a plan view representing the operation state of a trimming region designating tool.

The following describes the trimming region designating tool with reference to drawings:

FIG. 24 is a plan view representing the trimming region designating tool. FIG. 23 is a cross sectional view along the line I—I of FIG. 13. FIG. 15 is a plan view representing the operation state of a trimming region designating tool.

The trimming region designating tool T consists of two plates; (1) a first frame plate 1 of flat rectangular configuration having bent pieces 1a and 1b formed by folding two parallel edges on the long side each on one side, and (2) a second frame plate 2 having the same flat rectangular configuration as the aforementioned first frame plate 1. Two parallel edges on the long side of the second frame plate 2 are each sandwiched between bent pieces 1a and 1b of the first frame plate 1, whereby the first and second frame plates 1 and 2 are overlapped with each other in such a way that they are can slide in parallel with each other along the edge on the long side in the lateral direction.

Figure 22:
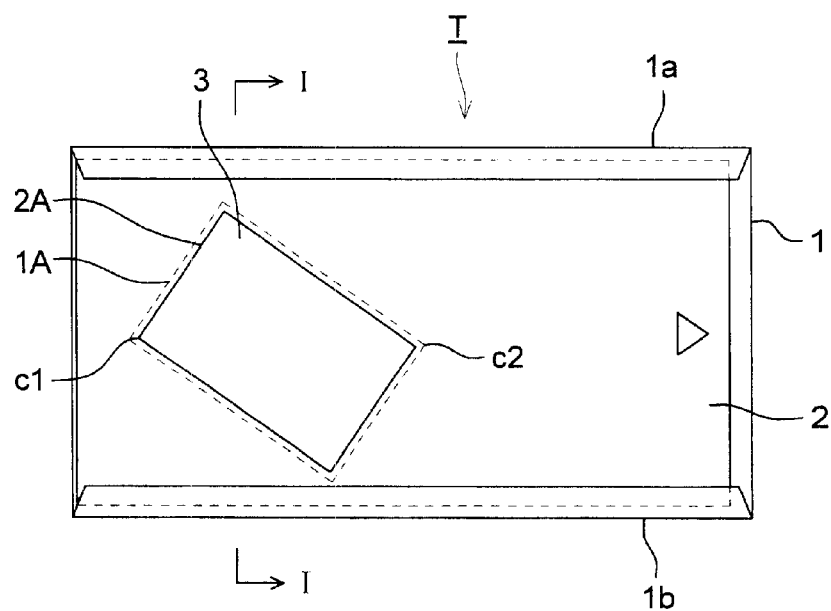
FIG. 22 is a plan view of a trimming region designating tool.

Flat rectangular notches 1A and 2A having the same size and same configuration are formed on the first and second frame plates 1 and 2. Notches 1A and 2A are each formed to be matched completely when the first and second frame plates 1 and 2 as shown in FIG. 22 are overlapped with each other. They are laid out in a slanted position to ensure that one diagonal line in notches 1A and 2A (one diagonal line in notches 1A and 2A formed by angles c1 and c2 in FIG. 22) is parallel to the sliding direction (lateral direction in the Figure) of the first and second frame plates 1 and 2. Then when the first and second frame plates 1 and 2 are slid parallel to each other as shown in FIG. 24, mutual positions of notches 1A and 2A are displaced according to the amount of slide. The size of an opening 3 formed by mutual overlapping of these notches 1A and 2A is changed in similar shapes with respect to the size of opening 3 shown in FIG. 22 where the opening has the maximum area due to matching of notches 1A and 2A.

Utilizing the opening 3 whose size can be changed in similar shapes, the trimming region designating tool T is used for the customer to define the region at a specific site desired to be trimmed by the customer in the image of the medium recording the image. Starting from the state where the opening 3 shown in FIG. 22 is the maximum, the first and second frame plates 1 and 2 are made to slide with each other so that the size of the opening 3 is reduced in similar shapes, whereby the customer himself can search for the site to be trimmed in the aforementioned image, and can define the size of the region freely as he wishes. In the definition of this region, the customer himself records a frame line (trimming region designation information) directly on the image along the frame configuration of the opening 3 using an appropriate writing tool, whereby the trimming region is defined.

The notches 1A and 2A are preferred have approximately the same configuration as the frame configuration of the aforementioned image where the trimming region is to be defined.

The medium where the image is recorded for the customer to define the trimming region using the aforementioned trimming region designating tool T is a medium recording the image information, preferably positive image information based on the image data obtaining from the image containing the subject. To put it more specifically, it is possible to mention a guide print for providing a guide display in the form of a list for a glance characterized as follows: In addition to the photographic print where the positive image is formed based on the image data, multiple images recorded on the image recording medium (floppy disk, CD-ROM, CD-R, other CDs, MO, memory chip, etc. as well as silver halide film (negative)) produced according to multiple image data obtaining from the image containing the subject are recorded as frame images, whereby the customer can easily specify the data stored in this image recording medium.

When consideration is given to direct recording of the frame line, use of the guide print P2 (FIG. 15) is preferred above all. Moreover, each frame image recorded on the guide print P2 has a comparatively small frame configuration. Therefore, the size of the notches 1A and 2A formed to have approximately the same configuration as the image frame can be made comparatively small, and the trimming region designating tool T can be designed in a small-sized structure for improved portability.

Figure 25:
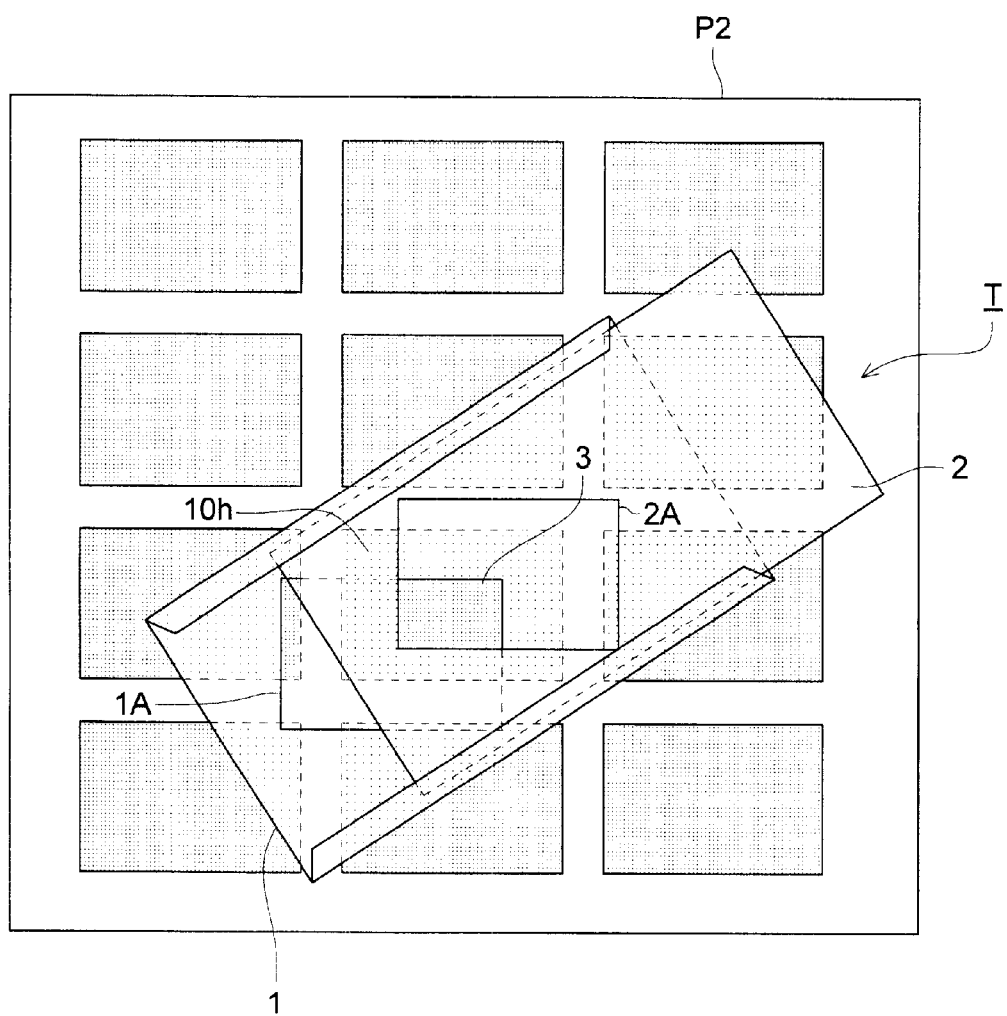
FIG. 25 is a plan view illustrating how to use a trimming region designating tool.

With reference to FIG. 25, the following describes how to employ a trimming region designating tool T using the aforementioned guide print P2:

In FIG. 25, when a customer desires to have a specific site in the 8th frame image 10h to be trimmed for example, the first frame plate 1 side of the trimming region designating tool T is applied to the guide print P2 to ensure that the frame image 10h can be visually observed through the opening 3. While the second frame plate 2 is slid toward the upper right shown in the drawing, the size of the opening 3 is changed freely to search for the site to be trimmed. If the site to be trimmed has been specified, the sliding distance of the second frame plate 2 is adjusted properly, whereby the size of the opening 3 is adjusted, and the region to be trimmed is determined. After the region to be trimmed has been determined, a frame line F is recorded directly on frame image 10h along the frame configuration of the opening 3 as trimming region designation information (FIG. 6), using a writing tool.

The frame line F recorded in this way is similar with respect to the size of the frame image 10, so the trimming region defined by this frame line F is formed in a similar configuration to the print size at the time of production as a photographic print. Thus, the customer himself records a frame line F on the frame image 10 using this trimming region designating tool T, and designation information on the trimming region of an adequate size can be created very easily. If the customer carries this guide print P2 to the photofinishing lab, he can very easily designate the image to be trimmed and indicate the accurate region to be trimmed in the image by means of frame line F. In this way, the intention of the customer is correctly conveyed to the photofinishing lab.

The first and second frame plates 1 and 2 are formed to improve the portability of the trimming region designating tool T. It is preferred that they be formed of a light-weight, less costly material permitting easy processing, for example, synthetic resin sheet, metallic sheet or paper.

Especially when the trimming region designating tool T is applied to the frame image 10, the frame image 10 can be seen through both frame plates 1 and 2 except for opening 3. To ensure easy search of the specific site to be trimmed in the frame image 10, these plates are preferred to be transparent or translucent using a synthetic resin sheet as material. To facilitate distinction between the trimming region facing the opening 3 and other regions in the frame image 10, the frame plates 1 and 2 are preferred to be translucent. The frame plates 1 and 2 may have different colors with each other.

The present invention provides a photographic print producing method wherein the idea held by the customer regarding the image is directly reflected and a photographic print trimmed in strict conformity to the customer requirement is produced simply and accurately.

The present invention provides a photographic print producing method capable of producing a portrait photographic print by trimming a specific human face in the image in a very simple manner.

The present invention also provides a trimming region designating tool which allows anybody to easily record an appropriate trimming region on the image, the aforementioned trimming region designating tool being characterized by a simple structure, reduced costs and capability of offering trimming region designation information.

What is claimed is:

1. A photographic guide print for guiding how to print image data corresponding to a photographic image; comprising:
    a sheet on which the image data are printed in a form of a standard sample image on a basis of a standard image processing condition;
    a remark section provided on the sheet so that information to designate an image processing condition how to retouch the standard sample image is written in the remark section in view of the standard sample image, and
    a transparent sheet provided so as to cover the sheet so that the sample image is observed through the transparent sheet,
    wherein the remark section is provided on the transparent sheet so that the information is written on the transparent sheet at a position corresponding to the standard sample image.

2. The photographic guide print of claim 1, wherein the image processing condition how to retouch the standard sample image is a condition as to at least one of an image density, a color, a tone, a lightness, a sharpness, an edge enhancement.

3. The photographic guide print of claim 1, wherein a plurality of sub sample images are printed on the sheet based on a plurality of image processing conditions different from the standard image processing condition.

4. The photographic guide print of claim 1, wherein the image data include data of a date which is printed at a first part of the standard sample image, and
wherein the remark section is marked at a second part of the standard sample image so that the printed position of the data of a date is shifted from the first part to the second part when the photographic image is printed in response to the remark section.

5. The photographic guide print of claim 4, wherein the remark section includes information to designate a color of the date.

6. The photographic guide print of claim 1, wherein when the standard sample image does not include a date, if the remark section is marked with a date at a part of the standard sample image, the date is printed at the marked part when the photographic image is printed in response to the remark section.

7. The photographic guide print of claim 6, wherein the remark section includes information to designate a color of the date.

8. The photographic guide print of claim 1, wherein the remark section includes information to print an additional image at a designated position and the additional image is printed at the designated position when the photographic image is printed in response to the remark section.

9. The photographic guide print of claim 8, wherein the additional image is marked at the designated position on the standard sample image.

10. The photographic guide print of claim 8, wherein the additional image marked at the designated position on the standard sample image are read by a scanner so as to produce image data of the additional image with position data of the designated position.

11. The photographic guide print of claim 1, wherein the remark section includes a mark to designate a trimming area on the standard sample image.

12. The photographic guide print of claim 11, wherein position data of the mark to designate a trimming area on the standard sample image are read by a scanner, partial image data in the trimming area are selected from the image data based on the position data of the mark and an image in the trimming area is printed based on the selected partial image data.

13. The photographic guide print of claim 11, wherein the mark to designate a trimming area is at least one of a line and a symbol.

14. The photographic guide print of claim 13, wherein when the standard sample image includes an image of a people, the mark to designate a trimming area is a line to depict a profile of the people.

15. The photographic guide print of claim 1, wherein the image data are a plurality of image data corresponding to a plurality of images and the plurality of image data are recorded in a form of a plurality of standard sample frame images on the sheet so that the plurality of standard sample frame images are looked at a glance on the sheet; and
wherein the remark section is provided for each of the plurality of standard sample frame images.

16. The photographic guide print of claim 15, wherein information to designate the number of prints and the size of a print is written in the remark section for each of the plurality of standard sample frame images.

17. The photographic guide print of claim 1, wherein the standard sample image is printed on a surface of the sheet which is made of a material on which the written information is erasable.

18. The photographic guide print of claim 1, further comprising:
a transparent sheet provided so as to cover the sheet so that the sample image is observed through the transparent sheet,
wherein the remark section is provided on the transparent sheet so that the information is written on the transparent sheet at a position corresponding to the standard sample image.

19. A photographic print producing method of producing a photographic print based on image data corresponding to a photographic image, comprising:
producing a guide print including a sheet on which the image data are printed in a form of a standard sample image on a basis of a standard image processing condition and a remark section provided on the sheet;
showing the guide print for a customer so that the customer writes information to designate an image processing condition how to retouch the standard sample image in the remark section in view of the standard sample image; and
producing a photographic print based on the designated image processing condition.

20. The photographic print producing method of claim 19, wherein the image processing condition how to retouch the standard sample image is a condition as to at least one of an image density, a color tone, a lightness, a sharpness, an edge enhancement.

21. The photographic print producing method of claim 19, wherein the remark section is marked at a designated position on the standard sample image with an additional image, and wherein the photographic print producing method further
comprises a step of reading the remark section by a scanner so as to produce position data of the designated position with data of the additional image.

22. A photographic guide print for guiding how to print a plurality of different image data sets corresponding to a plurality of framed different images photographed by a camera; comprising:
a sheet on which the plurality of different image data sets are printed in a form of a plurality of framed different sample images so that the plurality of framed different sample images are looked at a glance on the sheet; and
a plurality of remark sections provided on the sheet in such an arrangement that each of the plurality of framed different sample images is provided with a respective one of the plurality of remark sections so that printing information to designate an image processing condition how to print at least one of the plurality of different image data sets is written on a corresponding one of the plurality of remark sections in view of the plurality of framed different sample images.

23. The photographic guide print of claim 22, wherein the printing information includes a number of prints and a size of a print.

24. The photographic guide print of claim 22, wherein each of the plurality of remark sections has a respective different frame number for identification.

25. A photographic print producing method of producing a photographic print based on a plurality of different image data sets corresponding to a plurality of framed different images photographed by a camera, comprising:
producing a guide print including a sheet, wherein the plurality of different image data sets are printed on the sheet in a form of a plurality of framed different sample images and a plurality of remark sections are provided on the sheet in such an arrangement that each of the plurality of framed different sample images is provided with a respective one of the plurality of remark sections;

showing the guide print so that the plurality of framed different sample images are looked at a glance on the sheet;

writing printing information to designate an image processing condition how to print at least one of the plurality of different image data sets on a corresponding one of the plurality of remark sections in view of the plurality of framed different sample images; and producing a photographic print based on the printing information.

26. The photographic print producing method of claim 25, wherein the image processing condition how to print the sample image is a condition as to at least one of an image density, a color tone, a lightness, a sharpness, an edge enhancement.

27. The photographic print producing method of claim 25, wherein the printing information includes a number of prints and a size of a print.

28. The photographic print producing method of claim 25, wherein each of the plurality of remark sections has a respective different frame number for identification.

29. The photographic print producing method of claim 25, wherein the writing steps includes a step of marking a trimming area on at least one of the plurality of framed different sample images.

30. The photographic print producing method of claim 29, wherein the marking is conducted with at least one of a line and a symbol.

31. The photographic print producing method of claim 29, further comprising a step of reading the guide print by a scanner so as to produce position data of the trimming area, wherein the step of producing the photographic print is conducted based on the position data of the trimming area.

32. The photographic print producing method of claim 25, wherein the writing steps includes a step of marking a position of an additional image to be added on at least one of the plurality of framed different sample images.

33. The photographic print producing method of claim 32, further comprising a step of reading the guide print by a scanner so as to produce position data of the additional image, wherein the step of producing the photographic print is conducted based on the position data of the additional image.

34. The photographic print producing method of claim 32, wherein the additional image is at least one of a date, a character and a symbol.

* * * * *